United States Patent
Wegner et al.

(10) Patent No.: US 9,052,034 B1
(45) Date of Patent: Jun. 9, 2015

(54) BUCKET WITH WIRELESS REMOTE CONTROLLED GATE ASSEMBLY

(71) Applicants: James C. Wegner, New Hampton, IA (US); Nicholas J. Wegner, New Hampton, IA (US); Dean A. Olson, Orchard, IA (US)

(72) Inventors: James C. Wegner, New Hampton, IA (US); Nicholas J. Wegner, New Hampton, IA (US); Dean A. Olson, Orchard, IA (US)

(73) Assignee: GFW Enterprises, Inc., New Hampton, IA (US)

( * ) Notice: Subject to any disclaimer, the term of this patent is extended or adjusted under 35 U.S.C. 154(b) by 163 days.

(21) Appl. No.: 13/867,488

(22) Filed: Apr. 22, 2013

(51) Int. Cl.
*F16K 31/122* (2006.01)

(52) U.S. Cl.
CPC ..................................... *F16K 31/122* (2013.01)

(58) Field of Classification Search
USPC .................... 222/504, 544, 399, 63, 505, 561
See application file for complete search history.

(56) References Cited

U.S. PATENT DOCUMENTS

| | | | | |
|---|---|---|---|---|
| 1,360,805 A | * | 11/1920 | Sherman et al. | 222/504 |
| 1,829,182 A | * | 10/1931 | Beaumont | 222/504 |
| 2,033,586 A | * | 3/1936 | Noble | 177/122 |
| 2,642,206 A | * | 6/1953 | Reed | 222/429 |
| 3,099,368 A | * | 7/1963 | Turner et al. | 222/58 |
| 3,108,720 A | * | 10/1963 | Roach et al. | 222/318 |
| 3,252,630 A | * | 5/1966 | Berg | 222/331 |
| 3,815,515 A | * | 6/1974 | Ross, Jr. | 105/282.1 |
| 3,834,595 A | * | 9/1974 | Brock et al. | 222/504 |
| 3,866,799 A | * | 2/1975 | Rikker et al. | 222/63 |
| 4,009,906 A | * | 3/1977 | Sweet et al. | 298/27 |
| 4,580,698 A | * | 4/1986 | Ladt et al. | 222/55 |
| 5,311,822 A | * | 5/1994 | Bounds | 105/311.1 |
| 5,359,942 A | * | 11/1994 | Ward | 105/240 |
| 6,073,802 A | * | 6/2000 | Sampson et al. | 222/54 |
| 2014/0263429 A1 | * | 9/2014 | Keating et al. | 222/54 |

* cited by examiner

*Primary Examiner* — Donnell Long
(74) *Attorney, Agent, or Firm* — G. Brian Pingel; David M. Breiner; Camille L. Urban

(57) ABSTRACT

Disclosed is a bucket that may be used to transport a material. In example embodiments, the bucket may include a barrel configured to hold a material, a gate assembly arranged at a bottom of the barrel, a first control system comprising an electrically controlled valve configured to control the gate assembly, and a second control system configured to control the electrically controlled valve. In example embodiments, the second control system may include a receiver configured to receive a signal from a remote signal generator to control the electrically controlled valve.

16 Claims, 21 Drawing Sheets

BUCKET WITH WIRELESS REMOTE CONTROLLED GATE ASSEMBLY

BACKGROUND

1. Field

Example embodiments relate to a bucket with a gate assembly. In example embodiments, the bucket may be used for multiple purposes, such as storing and transporting concrete. In example embodiments, the bucket may include a system that allows the gate assembly to be operated by wireless remote control.

2. Description of the Related Art

Concrete is often moved from one location to another via buckets. Many of the buckets include gates which may be manually operated by a user to release the concrete stored therein. Generally, the gates are oriented so that the concrete flows out a side of the bucket. Furthermore, because most of these buckets require manual operation, the process of unloading a bucket may be somewhat laborious as an operator is required to approach the bucket to operate the gate.

SUMMARY

The inventors have sought to design a new and improved bucket which may be used to transport and unload various types of material, such as, but not limited to, concrete. The bucket is designed with a gate assembly that allows the material to be unloaded vertically from the bucket. Furthermore, the inventors' new type of bucket allows for wireless remote operation of the gate assembly so that the bucket may be unloaded by wireless remote control. This latter feature eliminates the need for an operator to approach the bucket to activate a gate assembly to unload the contents stored therein.

In accordance with example embodiments, a bucket may include a barrel for holding a material, a gate assembly attached to the barrel, a first control system configured to control the gate assembly, and a second control system configured to control the first control system, In example embodiments, the gate assembly may include an actuator and a gate configured to control a flow of the material flowing out of the barrel.

In accordance with example embodiments, a bucket may include a barrel configured to hold a material, a gate assembly arranged at a bottom of the barrel, a first control system comprising an electrically controlled valve configured to control the gate assembly, and a second control system configured to control the electrically controlled valve. In example embodiments, the second control system may include a receiver configured to receive a signal from a remote signal generator to control the electrically controlled valve. Also, in example embodiments, the gate assembly may include a base having a plurality of capture bars capturing a gate which is configured to slide along a length of the base. In addition, in example embodiments, the gate assembly may further include an actuator configured to move the gate to one of expose and cover an aperture in the base to allow the material to flow out of the bucket.

BRIEF DESCRIPTION OF THE DRAWINGS

Example embodiments are described in detail below with reference to the attached drawing figures, wherein.

DETAILED DESCRIPTION

Figure 1A:
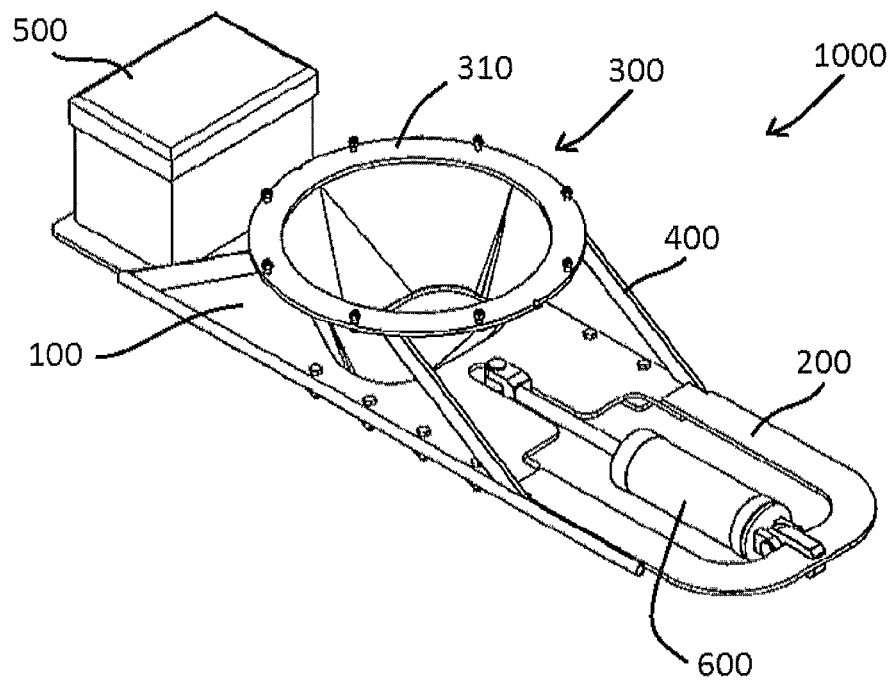
FIGS. 1A and 1B are views of a gate assembly in accordance with example embodiments.

Example embodiments will now be described more fully with reference to the accompanying drawings. Example embodiments are not intended to limit the invention since the invention may be embodied in different forms. Rather, example embodiments are provided so that this disclosure will be thorough and complete, and will fully convey the scope of the invention to those skilled in the art. In the drawings, the sizes of components may be exaggerated for clarity.

In this application, when an element is referred to as being "on," "attached to," "connected to," or "coupled to" another element, the element may be directly on, directly attached to, directly connected to, or directly coupled to the other element or may be on, attached to, connected to, or coupled to any intervening elements that may be present. However, when an element is referred to as being "directly on," "directly attached to," "directly connected to," or "directly coupled to" another element or layer, there are no intervening elements present. In this application, the term "and/or" includes any and all combinations of one or more of the associated listed items.

In this application, the terms first, second, etc. are used to describe various elements and components. However, these terms are only used to distinguish one element and/or component from another element and/or component. Thus, a first element or component, as discussed below, could be termed a second element or component.

In this application, terms, such as "beneath," "below," "lower," "above," "upper," are used to spatially describe one element or feature's relationship to another element or feature as illustrated in the figures. However, in this application, it is understood that the spatially relative terms are intended to encompass different orientations of the structure. For example, if the structure in the figures is turned over, elements described as "below" or "beneath" other elements would then be oriented "above" the other elements or features. Thus, the term "below" is meant to encompass both an orientation of above and below. The structure may be otherwise oriented (rotated 90 degrees or at other orientations) and the spatially relative descriptors used herein interpreted accordingly, Example Embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a bucket with a gate assembly. In example embodiments, the bucket may be used for multiple purposes, such as storing and transporting concrete. In example embodiments, the bucket may include a system that allows the gate assembly to be operated by wireless remote control.

Figure 1B:
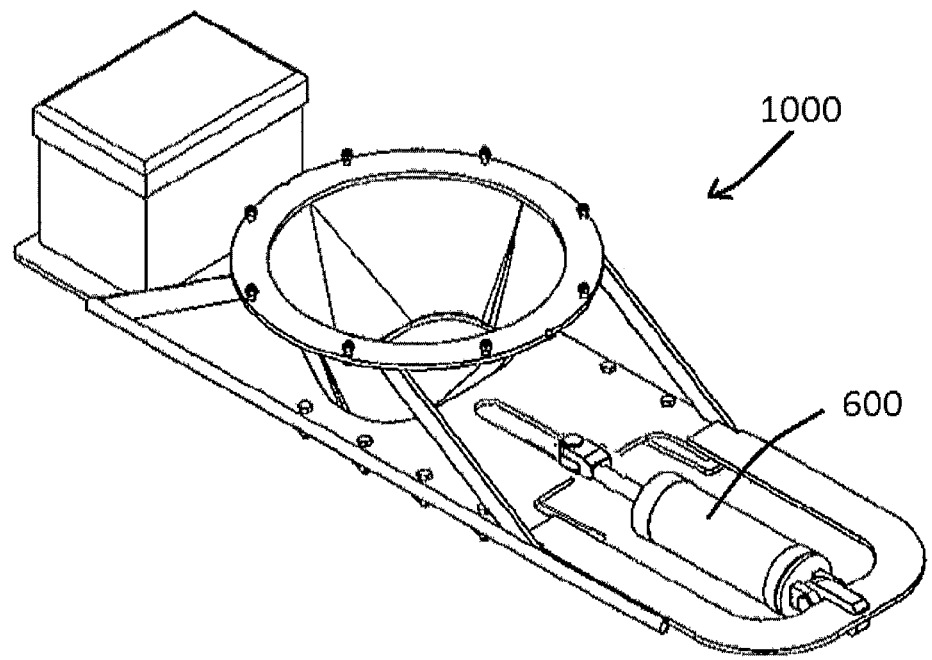
Figure 2A:
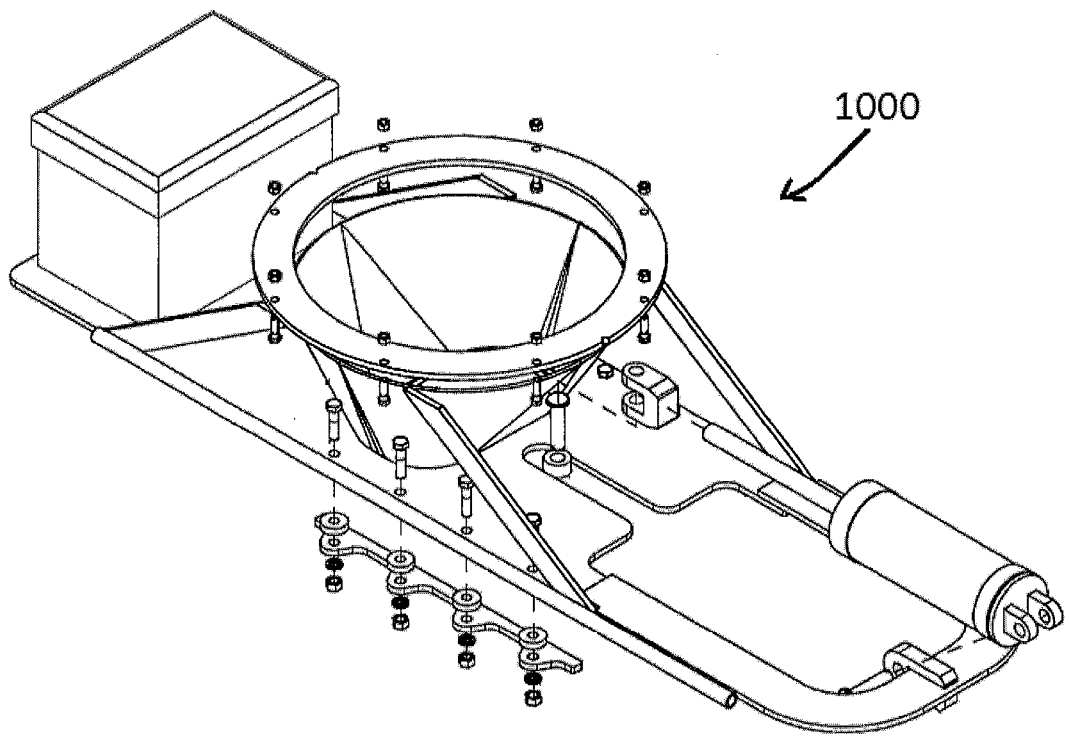
FIGS. 2A and 2B are exploded views of the gate assembly in accordance with example embodiments.
Figure 2B:
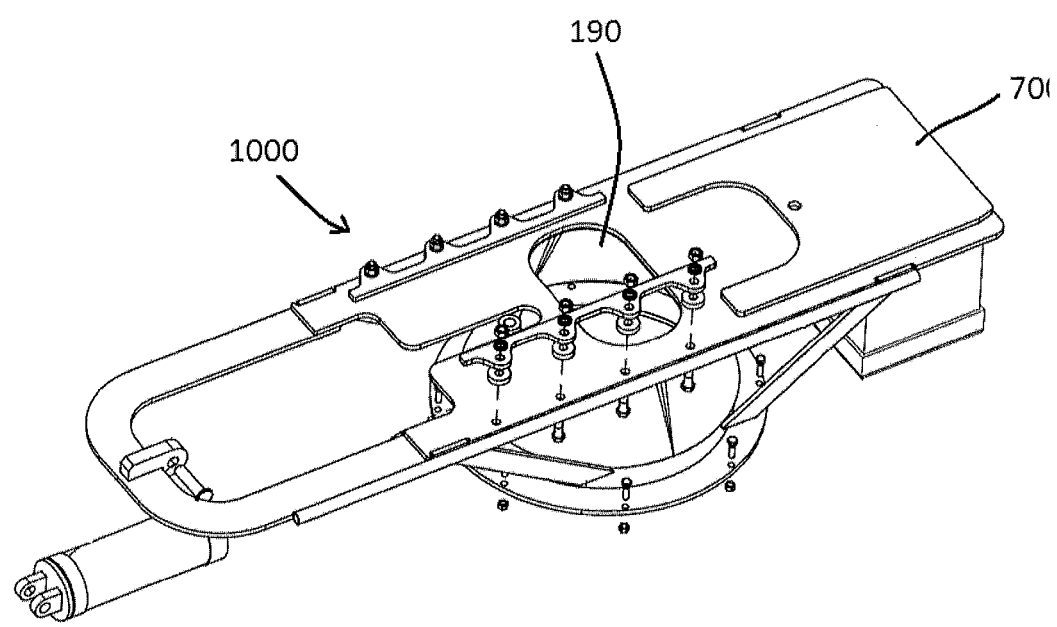

FIGS. 1A and 1B are views of a gate assembly 1000 in accordance with example embodiments and FIGS. 2A and 2B are exploded views of the gate assembly 1000 in accordance with example embodiments. As shown in FIGS. 1A-2B, the gate assembly 1000 may include a base 100, a supplemental base member 200, a funnel 300, a plurality of support members 400, a battery box 500, an actuator 600, and a gate 700. In example embodiments, the actuator 600 may be configured to move the gate 700 along a length of the base 100 to cover or expose an opening 190 in the base 100.

Figure 3:
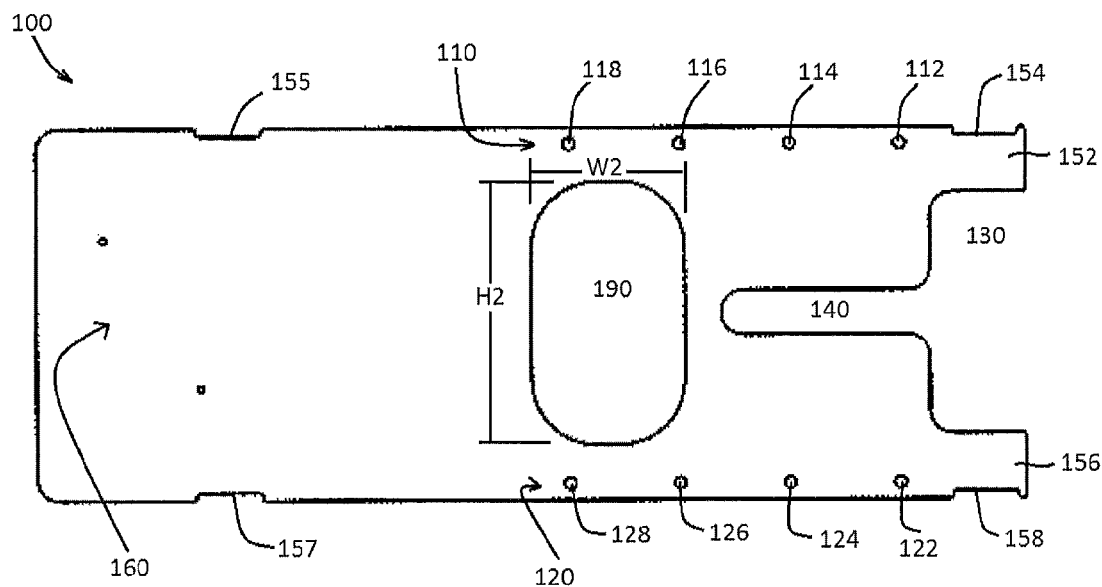
FIG. 3 is a view of a base of the gate assembly in accordance with example embodiments.

FIG. 3 is a top view of the base 100 in accordance with example embodiments. As shown in FIG. 3, the base 100 may resemble a substantially flat plate having a substantially constant thickness. The invention, however, is not limited by this aspect of example embodiments since the base 100 is not required to be fabricated as a plate having a constant thickness. For example, the base 100 may be formed of a plate having a variable thickness, or a stepped thickness wherein some portions of the base 100 are "thicker" than other portions of the base 100. As yet another example, the base 100 may be formed from other structural materials such as tubes.

As shown in FIG. 3, the base 100 may include a first aperture 190. As shown in FIG. 3, the first aperture 190 may resemble a slotted hole. This aspect of example embodiments, however, is not meant to limit the invention as the shape of the first aperture 190 may be another shape such as a circular, square, rectangular, trapezoidal or even an irregular shape. In example embodiments, the first aperture 190, as will be explained shortly, may be configured to allow material to pass through the base 100.

As shown in FIG. 3, the base 100 may include a first plurality of holes 110 and a second plurality of holes 120. In example embodiments, the first plurality of holes 110 may include a first hole 112, a second hole 114, and third hole 116, and a fourth hole 118. Likewise, the second plurality of holes 120 may include a first hole 122, a second hole 124, and third hole 126, and a fourth hole 128. In example embodiments, the first and second plurality of holes 110 and 120 are each illustrated as having four holes, however, this aspect of example embodiments is not intended to limit the invention since each of the first and second pluralities of holes 110 and 120 may have more or less than four holes. In addition, as will be explained shortly, the first and second pluralities of holes 110 and 120 may be omitted entirely.

In example embodiments, the base 100 may include a first tab 152 and a second tab 156 which may be configured to act as a landing for a third tab 212 and a fourth tab 216 of the supplemental base member 200. Between the first tab 152 and the second tab 156 is an open area 130. The open area 130 may be configured to allow the actuator 600 to reside therein. In example embodiments, a slotted area 140 may extend from the open area 130. In example embodiments, a portion of the actuator 600 may pass through the slotted area 140. The open area 130 and the slotted area 140 are not meant to limit the invention. For example, rather than having an open area 130 and a slotted area 140, the base 100 may have a single large opening in which the actuator 600 may partially reside. As yet another example, the open area 130 and the slotted area 140 may be omitted entirely.

In example embodiments, the base 100 may further include a first recess 154, a second recess 155, a third recess 157, and a fourth recess 158. In example embodiments, the first, second, third and fourth recesses 154, 155, 157, and 158 may accommodate portions of the support members 400. For example, the support members 400 may resemble trapezoidal plates with ends that are insertable into the first, second, third, and fourth recesses 154, 155, 157, and 158. Example embodiments, however, are not limited by the first, second, third, and fourth recesses 154, 155, 157 and 158 as the recesses may be omitted in their entirety. For example, the support members 400 may simply attach to an upper surface of the base 100, In example embodiments, the base 100 may further include a third plurality of holes 160. The third plurality of holes 160 may be provided so that screws may penetrate the base 100 to attach the battery box 500 to the base 100. The third plurality of holes 160, however, is not intended to limit example embodiments as it is not required. For example, rather than bolting the battery box 500 to the base 100, the battery box 500 may be welded to the base 100 or otherwise secured to the base 100, for example, by pinning or by an adhesive. In addition, although the third plurality of holes 160 is illustrated as including two holes, this aspect of example embodiments is not intended to limit the invention as the third plurality of holes 160 may include only a single hole or more than two holes.

Figure 4:
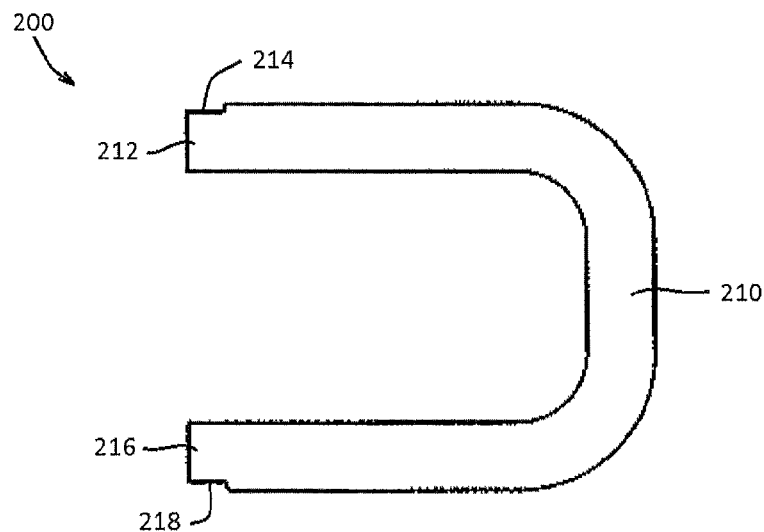
FIG. 4 is a view of a supplemental base member in accordance with example embodiments.

FIG. 4 is a top view of the supplemental base member 200 in accordance with example embodiments. As shown in FIG. 4, the supplemental base member 200 may resemble a U-shaped member. In example embodiments, the supplemental base member 200 may be cut from a plate and thus may have a substantially constant thickness. Example embodiments, however, are not limited thereto as the supplemental base member 200 may have a varying thickness. Furthermore, the supplemental base member 200 is not required to be formed from a plate. For example, the supplemental base member 200 may be formed from another structure such as tube steel. In addition, the invention is not limited to a supplemental base member 200 having a U-shape as the supplemental base member 200 may have another shape such as, but not limited to, a C-shape, a V-shape, a square shape, or a rectangular shape.

Figure 5A:
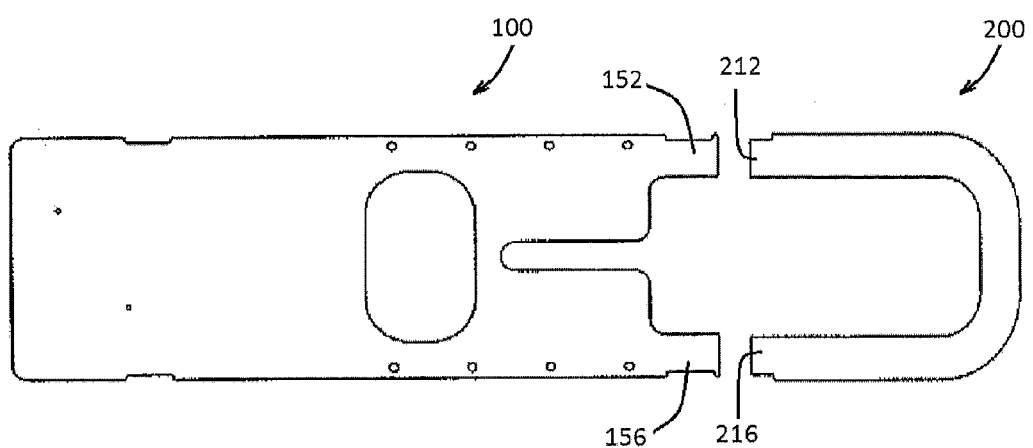
FIGS. 5A and 5B are views showing an assembly of the base and the supplemental base member in accordance with example embodiments.
Figure 5B:
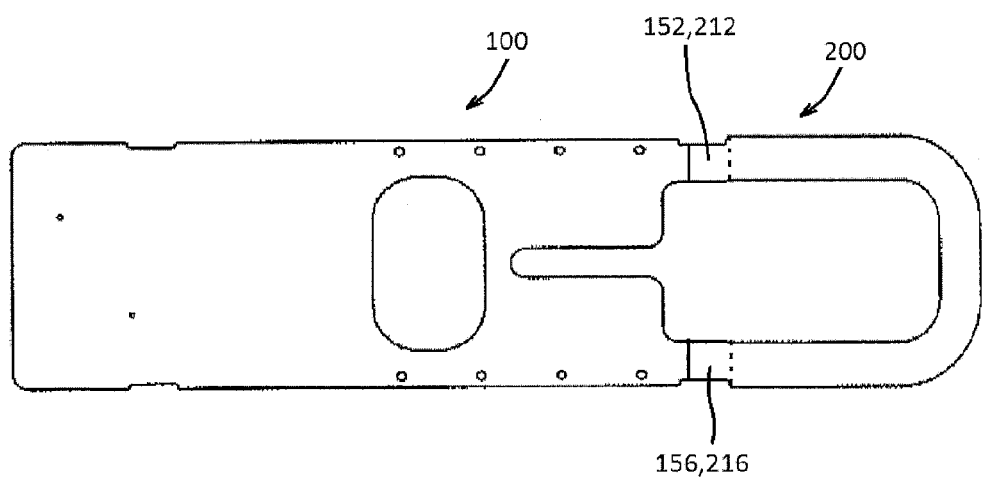

FIGS. 5A and 5B illustrate the supplemental base member 200 being mounted to the base 100. In example embodiments, the third and fourth tabs 212 and 216 of the supplemental base member 200 may be arranged over the first and second tabs 152 and 156 as shown in FIG. 5B so that the supplemental base member 200 and the base 100 may be connected to one another via a conventional process such as bolting, welding, and/or pinning.

In example embodiments, rather than forming a base 100 and a supplemental base member 200 as separate members which are later connected together, a single unitary piece having substantially the same dimensions of the connected base 100 and supplemental base 200 may be used. For example, a single member having substantially the same dimensions of the combined base 100 and supplemental base 200 may be formed by a casting process. As yet another example, a single plate may be cut with holes and apertures similar to the holes and apertures existing in the combined base 100 and supplemental base 200.

Figure 6:
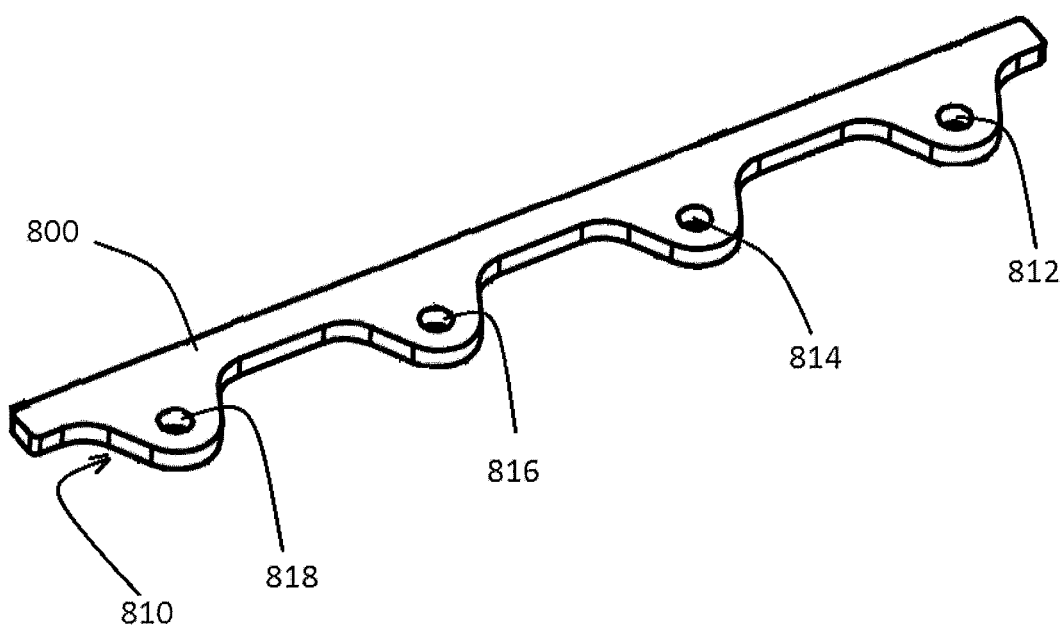
FIG. 6 is a view of a capture bar in accordance with example embodiments.

FIG. 6 is a view of a capture bar 800 in accordance with example embodiments. In example embodiment the capture bar 800 may include a fourth plurality of holes 810 which may have substantially the same number of holes as either (or both of) the first and/or second plurality of holes 110 and 120. Furthermore, the spacing of the fourth plurality of holes 810 may be about the same as the spacing of either (or both of) the first and/or second plurality of holes 110 and 120. For example, the fourth plurality of holes 810 may include a first hole 812, a second hole 814, a third hole 816, and a fourth hole 818 with substantially the same spacing as the first, second, third, and fourth holes 122, 124, 126, and 128 of the second plurality of holes 120.

Figure 7:
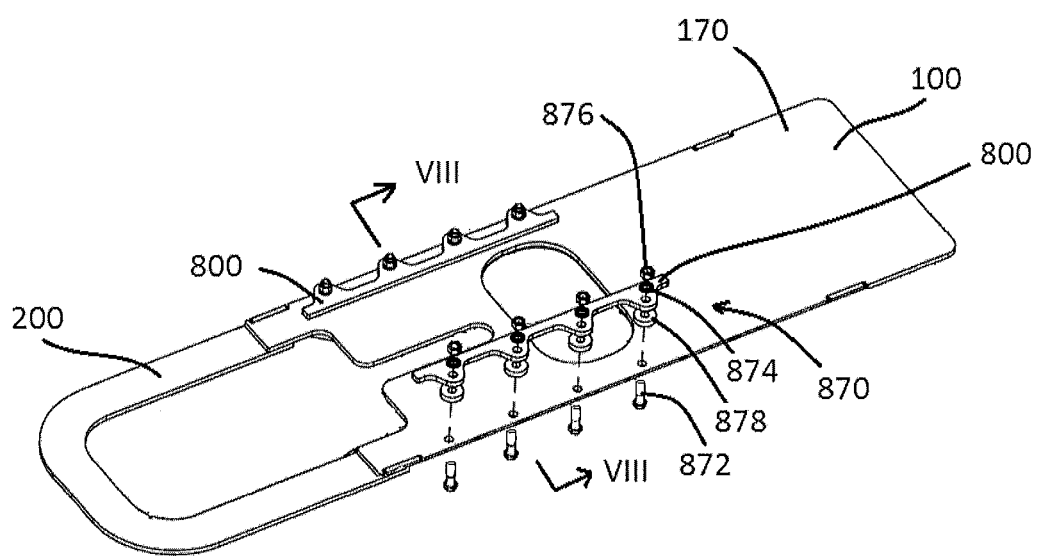
FIG. 7 is a partial assembly drawing of the gate assembly in accordance with example embodiments.
Figure 8A:
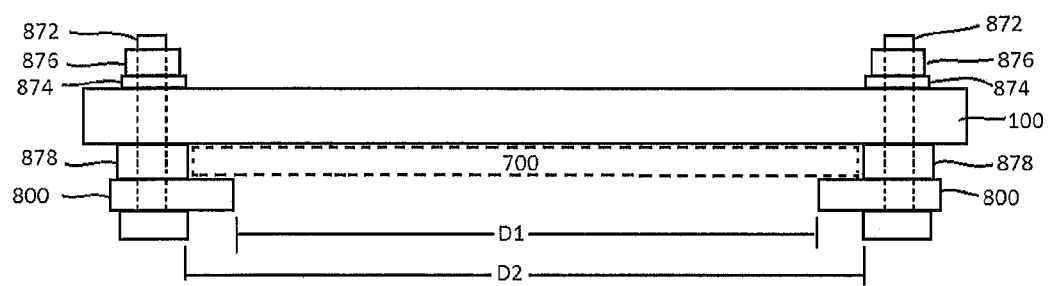
FIGS. 8A-8C are section views of a gate assemblies in accordance with example embodiments.

In example embodiments, the gate assembly 1000 may include two capture bars 800 that may be attached to the base 100 in a manner that allows them to "capture" the gate 700. For example, as shown in at least FIGS. 7 and 8, the capture bars 800 may be attached to the base 100 buy a plurality of fastening members 870. The fastening members 870, for example, may include bolts 872, lock washers 874, and nuts 876. In example embodiments, spacers 878, which may resemble short cylinders, may be placed between the base 100 and the captures bars 800 to separate the captures bars 800 from the base 100. For example, referring to FIG. 8A (which is a cross section of the base 100 having the capture bars attached thereto), a space is provided between the base 100 and the capture bars 800 which allow the gate 700 to slide therein.

Figure 9:
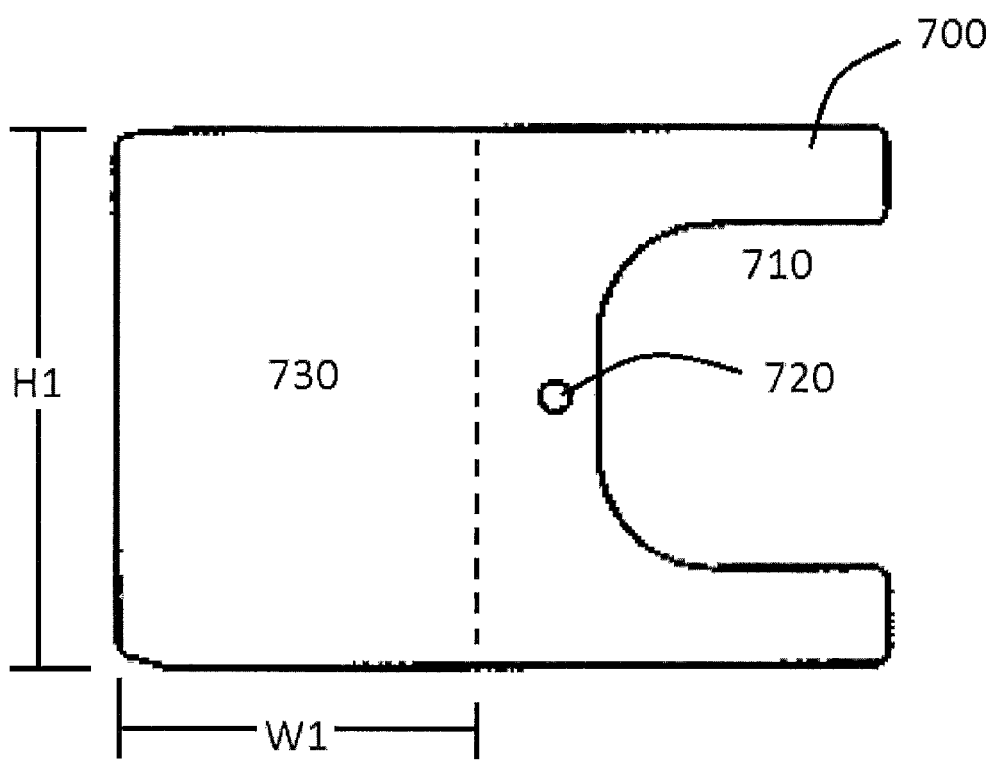
FIG. 9 is a view of a gate in accordance with example embodiments.

FIG. 9 is a view of the gate 700. In example embodiments, the gate 700 may include a main body 730 having an area large enough to cover the aperture 190 of the base 100. For example, in example embodiments, the main body 730 may resemble a rectangular area having a width W1 and a height H1 larger than a width W2 and height H2 of the aperture 190 (see FIG. 3). In addition, the height H1 of the gate 700 may be about the same as, or larger than a distance D1 separating the capture bars 800 but smaller than a distance D2 separating the spacers D1 Furthermore, in example embodiments, the gate 700 may be fabricated from a plate having a relatively constant thickness which may be about the same as, or smaller than the thickness of the spacers 878.

In example embodiments, the gate 700 may include an open area 710 which may be configured to accommodate the actuator 600 and a hole 720 which may allow the actuator 600 to attach to the gate 700. For example, the hole 720 may allow a portion of the actuator to be pinned to the gate 700. These aspects of example embodiments, however, are not intended to limit the invention since the actuator 600 may be connected to the gate 700 by another means, such as by brackets. Furthermore, the open area 710 may be omitted in its entirety.

Figure 10A:
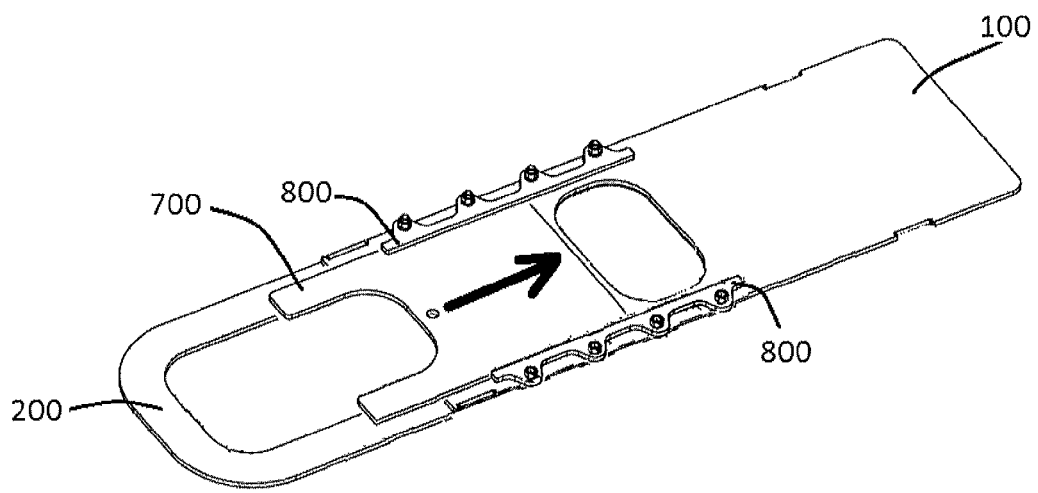
FIGS. 10A-10B illustrate view of the gate captured by the capture bars and moving along a length of the base in accordance with example embodiments.
Figure 10B:
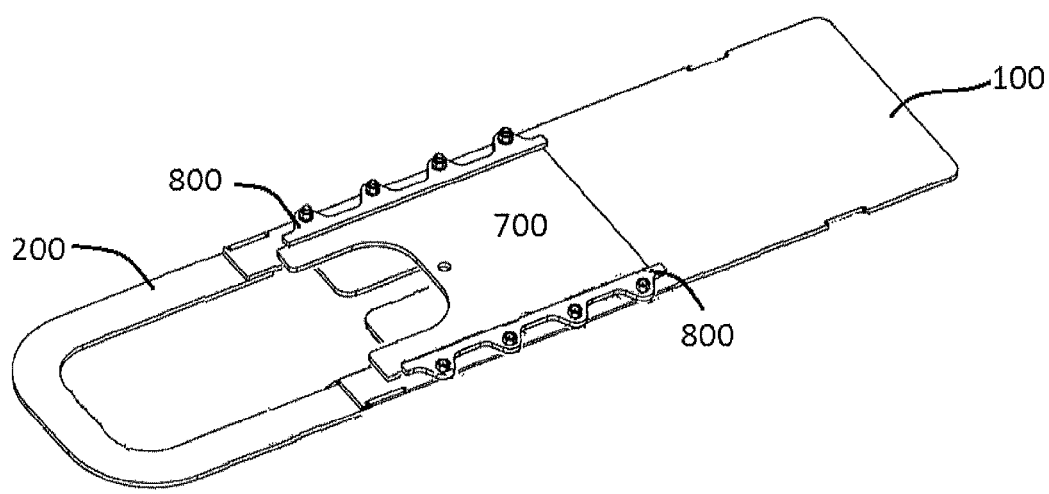

In example embodiments, the gate 700 may be captured by the capture bars 800, the fasteners 870, and the base 100 at least because the capture bars 800 and the base 100 may prevent movement of the gate 700 in a first direction (for example, a direction perpendicular to the base 100) and the spacers 878 may prevent motion of the gate 700 in a second direction (for example, a direction lateral to the base 100). For example, referring to FIGS. 10A and 10B, it is observed that the gate 700, while being captured by the capture bars 800, the fasteners 870, and the base 100, may still slide along a length of the base 100. For example, as shown in FIG. 10A, the gate 700 may be in a first position where the body 730 does not cover the aperture 190. However, as shown in FIG. 10B, the gate 700 may be moved along the length of the base 100 so that the body covers the aperture 190. Thus, by moving the gate 700 back and forth along the base 100, the aperture 190 may be covered or exposed.

Figure 8B:
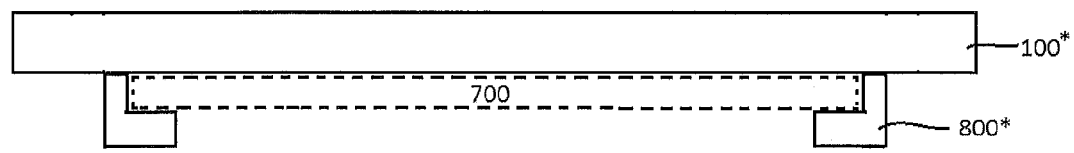
Figure 8C:
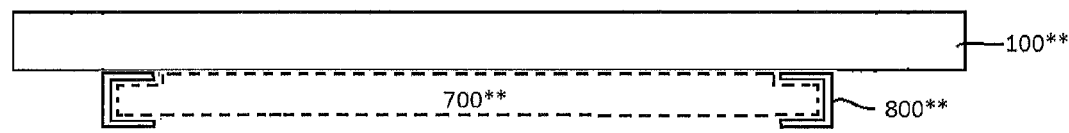

Example embodiments are not intended to be limited to a structure having a base 100 with a first plurality of holes 110 and a second plurality of holes 120, connectors 180, and capture bars 800. For example, as shown in FIG. 8B, rather than using fasteners 180 to bolt a capture bar 800 to the base 100, angle members 800* may be welded to the base 100 and arranged so that the gate 700 is captured therein. Thus, rather limiting the capture bars 800 to flat shaped members, example embodiments may use angle shaped capture bars 800*. As yet another example, channel shaped members 800** may be used as capture bars 800 to capture a gate 700* having a stepped profile as shown in FIG. 8C. Thus, rather limiting the capture bars to flat shaped members 800 or angled members 800*, example embodiments may use channel shaped capture bars 800* and stepped gates 700**.

Figure 11:
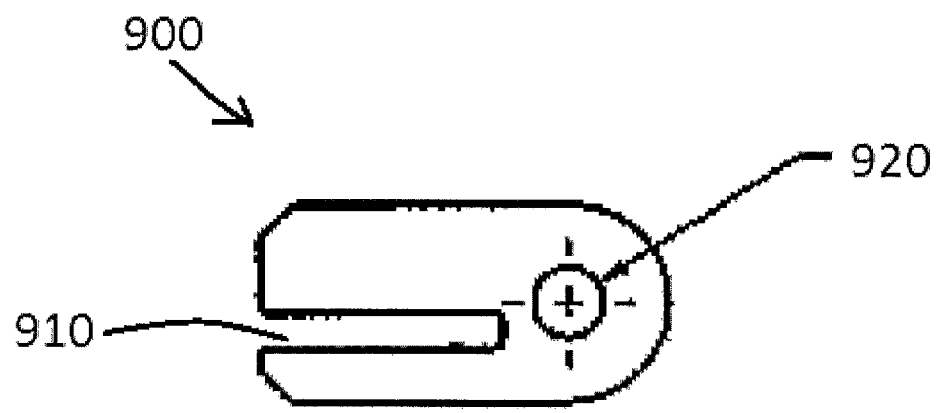
FIG. 11 is a view of a connecting member in accordance with example embodiments.

FIG. 11 is a view of a connecting member 900 which may be used to connect the actuator 600 to the supplemental base member 200. In example embodiments, the connecting member 900 may include a slot 910 into which a portion 210 of the supplemental base member 200 may be inserted. In example embodiments, the connecting member 900 may also include an aperture 920, for example, a circular hole, which may allow the actuator 600 to attach to the connecting member 900.

Figure 12A:
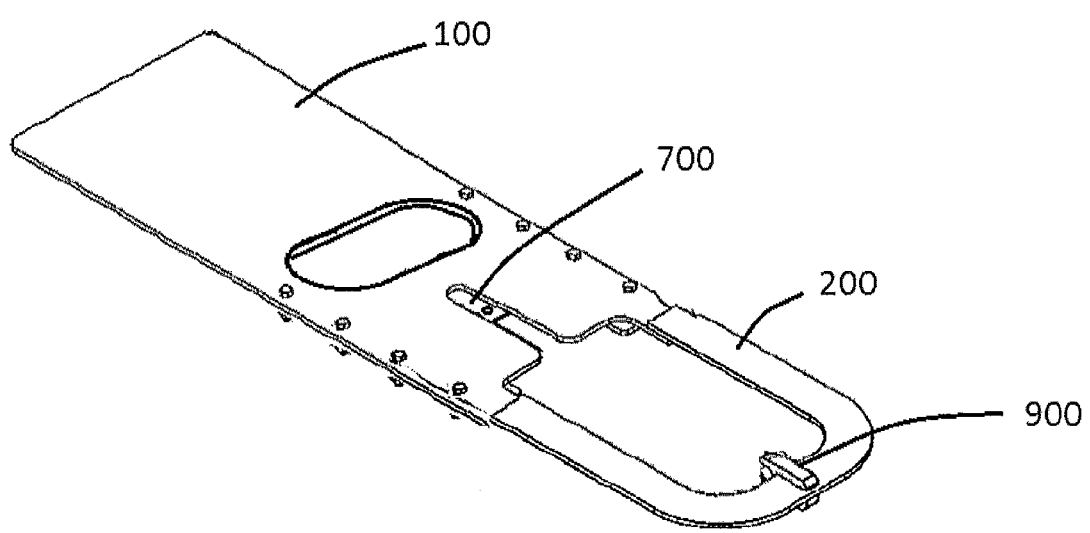
FIG. 12A illustrates the gate assembly without an actuator in accordance with example embodiments.
Figure 12B:
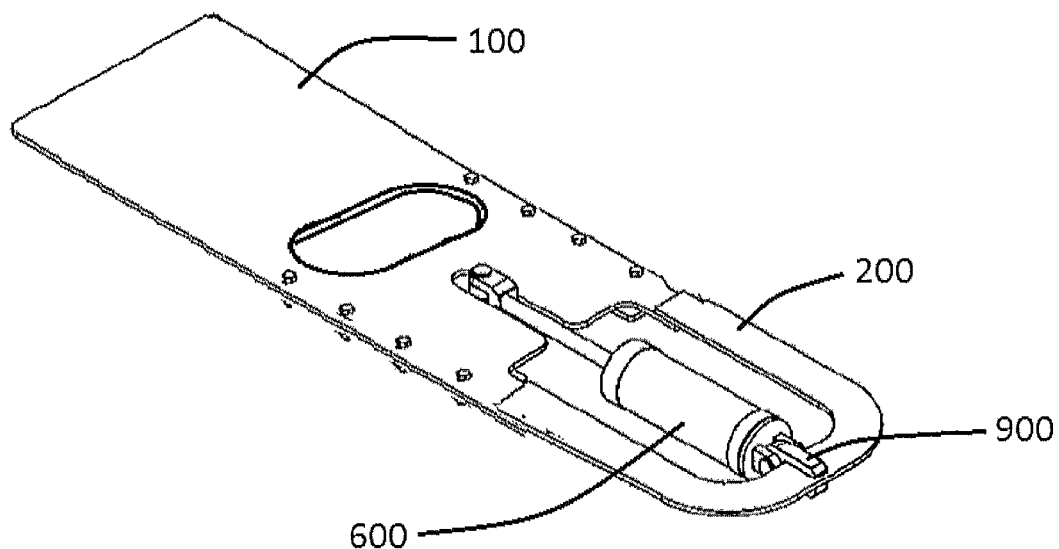
FIGS. 12B-12C illustrate the gate assembly having the actuator attached thereto.
Figure 12C:
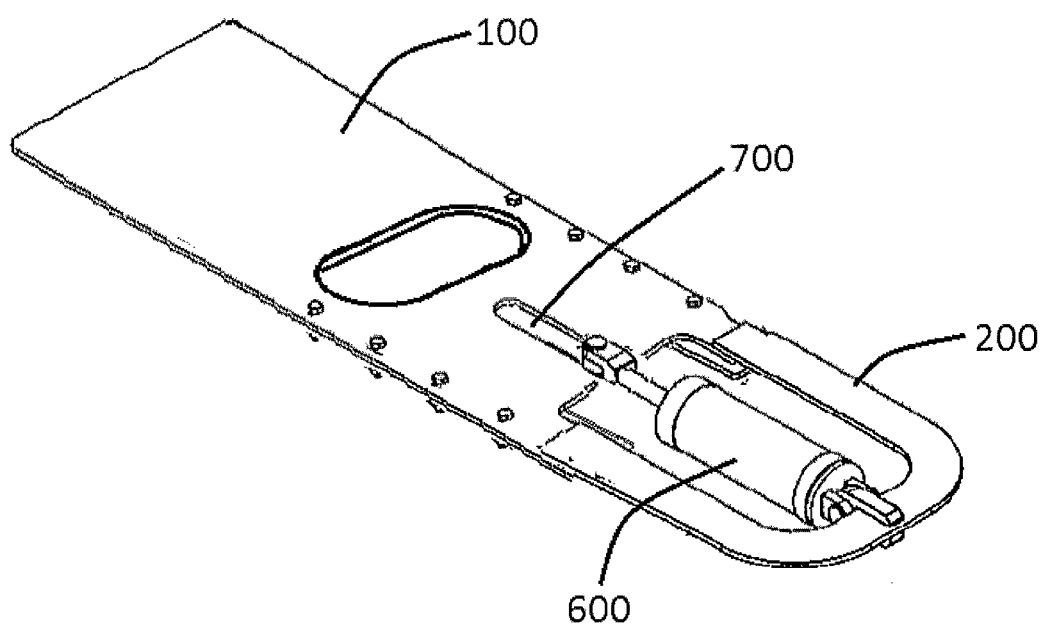

FIG. 12A illustrates the connecting member 900 attached to the supplemental base member 200. FIG. 12B shows the actuator 600 attached to the connecting member 900 and the gate 700. As shown in at least FIG. 12B, the actuator may be a cylinder, for example, a pneumatic or a hydraulic cylinder. As shown in FIG. 12B, when the actuator is a cylinder, a barrel of the cylinder may be attached to the connecting member 900 and a rod of the cylinder may be attached to the gate 700. In FIG. 12B, the rod is shown in an extended position. Thus, in FIG. 12B, the body 730 of the gate 700 may cover the aperture 190 of the base 100. FIG. 12C illustrates the rod in retracted position. In FIG. 12C, because the rod is pulled back, the gate 700 is pulled away from the aperture 190 thus exposing the aperture 190.

In example embodiments, the funnel 300 may be attached to the base 100. In example embodiments, an end of the funnel 300 facing the base 100 may have an opening which is substantially the same as the aperture 190 of the base 100 and another end of the funnel 300 may be fitted with a flange 310 to connect the funnel to an external structure. In example embodiments, the flange 310 may be configured with holes that allow the flange 310 to bolt to the external structure. In example embodiments, the funnel 300 may be attached to the base 100 by a conventional process such as welding, bolting, or clipping. In example embodiments, the flange 310 may be annular shaped as shown in FIGS. 1A-2B, however, example embodiments are not limited thereto. For example, the flange 310, rather than being annular shaped, may have a polygonal shape, such as square, a rectangular, or an octagonal shape. Thus, the flange 310 may be configured to attach to various types of structures.

In example embodiments, the funnel 300 may be reinforced by the plurality of support members 400. The support members 400 may resemble trapezoidal members having one end attached to the base 100 and another end attached to the funnel 300. For example, the support members 400 may attach to the flange 310 of the funnel 300.

In example embodiments, the gate assembly 1000 may further include the battery box 500 which may be attached to the base 100 by a conventional method such as bolting, pinning, or welding. In example embodiments, the battery box 500 may house a battery which may be used to regulate a valve that may control a fluid, for example, air or hydraulic fluid, that may be used to control the actuator 600.

Thus far, example embodiments have illustrated a base 100 attached to a supplemental base member 200, wherein the base 100 includes capture members 800 capturing a gate 700. In example embodiments, an actuator 600 attached to the supplemental base member 200 and the gate 700 may be operated to move the gate 700 along a length of the base 100 thus allowing an aperture 190 of the base 100 to be covered or exposed. Accordingly, by controlling the actuator 600, one may control whether or not the aperture 190 of the base 100 is covered or exposed.

Figure 13:
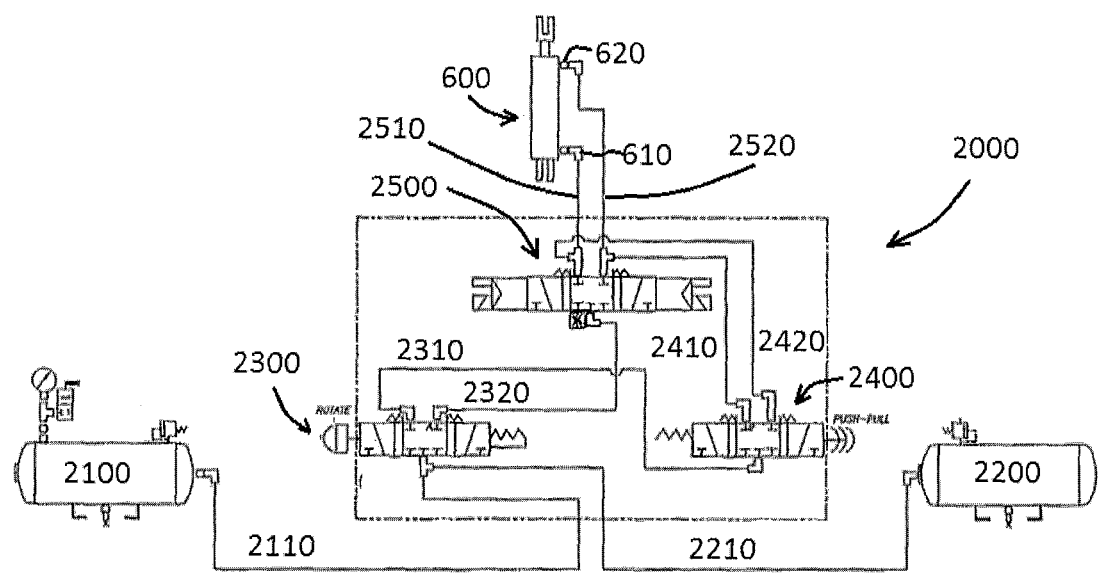
FIG. 13 is a view of a first control system in accordance with example embodiments.

FIG. 13 illustrates an example of a first control system 2000 that may be used to control the actuator 600. This example first control system 2000, however, is for purposes of illustration only and is not intended to limit the invention. In the nonlimiting example of a first control system 2000, the actuator 600 is illustrated as a pneumatic cylinder. As shown in FIG. 13, the first control system 2000 may include a first air source 2100 and a second air source 2200. In example embodiments, the first and second air sources 2100 and 2200 may be twenty six gallon tanks configured to house air at about one hundred and twenty five pounds per square inch (psi). In example embodiments, the first air source 2100 may feed air to a first valve 2300 via a first hose 2110 and the second air source 2200 may feed air to the first valve 2300 via a second hose 2210. In example embodiments the first and second hoses 2110 and 2210 may connect to a T fitting which may be connected to the first valve 2300.

Figure 14A:
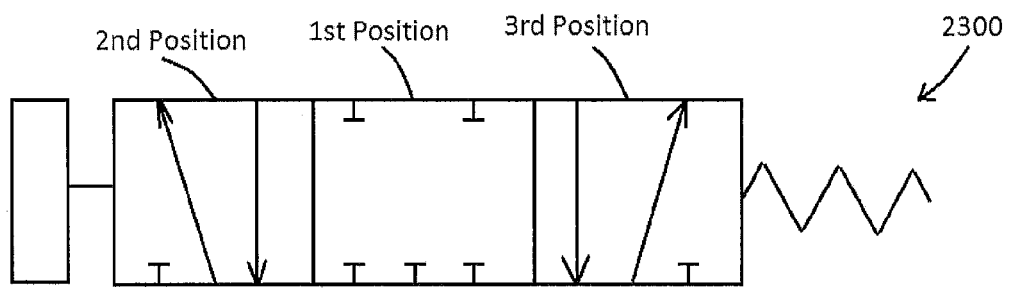
FIGS. 14A-14C illustrate various positions for valves associated with the first control system in accordance with example embodiments.

In example embodiments, the first valve 2300 may be a rotary valve configured to at least one of direct fluid (for example, air) to a second valve 2400 and direct fluid to a third valve 2500. For example, when the first valve 2300 is in a first position (see FIG. 14A), air may be prevented from flowing to either the second valve 2400 or the third valve 2500. When the first valve 2300 is in a second position, fluid may flow to the second valve 2400 via a third hose 2310. When the first valve 2300 is in a third position, fluid may flow to the third valve 2500 via a fourth hose 2320.

Figure 14B:
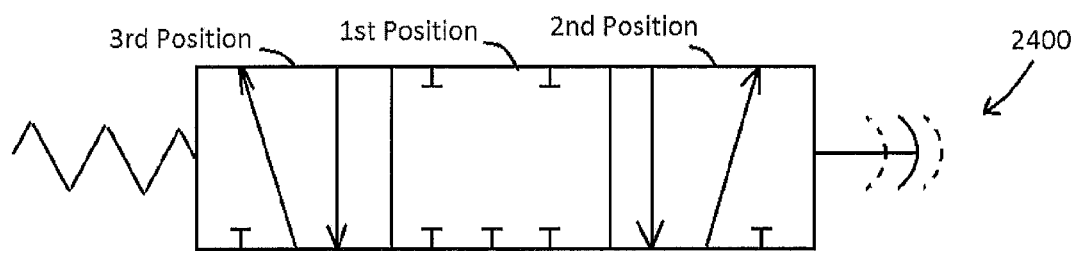

In the event the first valve 2300 is in the second position fluid may flow from the first valve 2300 to the second valve 2400. In example embodiments, the second valve 2400 may be configured to at least one of direct the fluid to a first port 610 of the actuator 600 and direct the fluid to a second port 620 of the actuator 600. For example, in the event the second valve 2300 is in a first position (see FIG. 14B), the fluid is prevented from flowing to the actuator 600. In the event the second valve 2300 is in the second position, the fluid may flow to through a fifth hose 2410 to the first port 610 of the actuator 600 causing a rod of the actuator 600 to extend. In the event the second valve 2300 is in the third position, fluid may flow through a sixth hose 2420 to the second port 620 causing the rod to retract. In example embodiments, the second valve 2400 may be a button valve which may allow for manual control of the actuator 600. For example, if the button is pulled, the second valve 2400 may assume the second configuration which allows the actuator 600 to extend. In the event the button is pushed, the second valve 2400 may assume the third position which may allow the rod to retract into a barrel of the actuator 600. Therefore, by pushing or pulling the button valve, a user may either cause the rod of the actuator 600 to extend or retract.

Figure 14C:
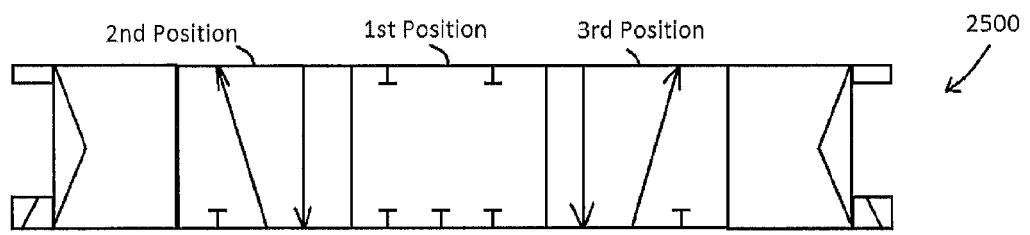

In the event the first valve 2300 is in the third position, fluid may flow from*the first valve 2300 to the third valve 2500. In example, embodiments, the third valve 2500 may be configured to one of prevent the fluid from flowing to the actuator 600, direct the fluid to a first port 610 of the actuator 600, and direct the fluid to a second port 620 of the actuator 600. For example, in the event the third valve 2400 is in a first position (see FIG. 14C), the fluid is stopped from flowing. In the event the third valve 2400 is in the second position (see FIG. 14C), the fluid may flow to through a seventh hose 2510 and to the first port 610 of the actuator 600 causing a rod of the actuator to extend. In the event the third valve 2400 is in the third position, fluid may flow through an eighth hose 2520 and to the second port 620 causing the rod to retract. In example embodiments, the third valve 2500 may be a solenoid valve which may allow for electronic and/or remote control of the actuator 600. For example, if the solenoid valve is controlled to be in the second position the actuator 600 may extend. If the solenoid valve is controlled to be in the third position, the rod of the actuator 600 may retract into a barrel of the actuator 600. Thus, example embodiments provide a system in which the actuator of the gate assembly 1000 may be either remotely controlled or manually controlled.

Example embodiments are not intended to be limited by the aforementioned control system. For example, in example embodiments, rather than having a first valve with three positions, the first valve may only have two positions. Furthermore, in the event only a remote controlled cylinder is desired, the first and second valves 2300 and 2400 may be omitted entirely and fluid may be flowed directly to the third valve 2500. On the other hand, if only manual operation is desired, then the first and third valves 2300 and 2500 may be omitted and the fluid from the first and second tanks may be flowed directly to the second valve 2400. Also, example embodiments are clearly not limited to pneumatic systems as the principles of the first control system 2000 may be applied to a hydraulic system.

Figure 15:
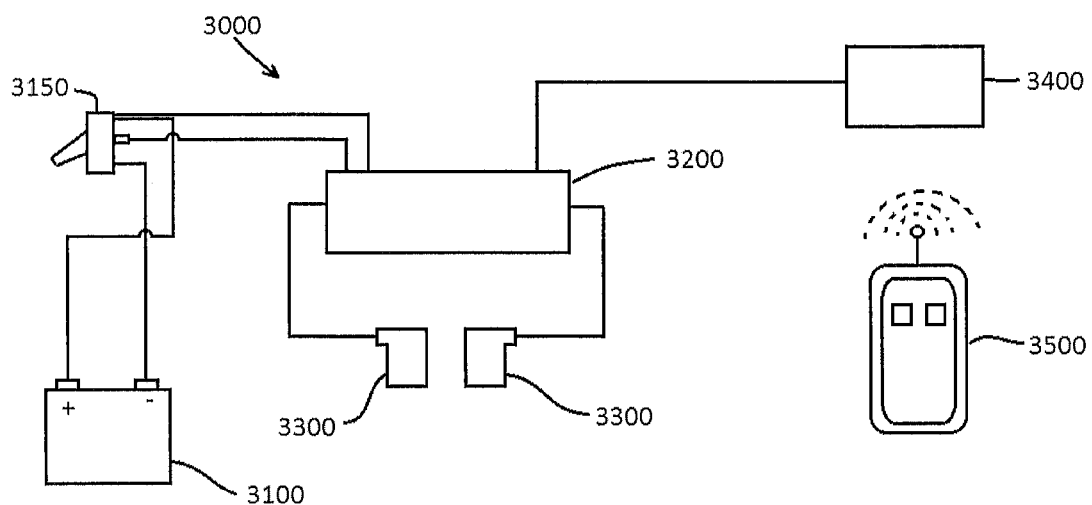
FIG. 15 is a view of an electrical system (an example of a second control system) in accordance with example embodiments.

FIG. 15 is a view of a second control system 3000 usable with example embodiments, In example embodiments the second control system 3000 may include a power source 3100 (for example, a battery). In example embodiments, when the power source 3100 is a battery, the battery may be housed in the battery box 500. In example embodiments, the battery may be a Group 24 Deep cycle battery, though example embodiments are not limited thereto, In example embodiments, the second control system 3000 may include a junction box 3200 connected to the power source 3100 by a switch 3150. Thus, power may be sent to the junction box 3200 from the power source 3100 by activating the switch 3150. The junction box 3200 may be connected to the third valve 2500 of the second control system 2000. For example, in example embodiments, the electrical system 3000 may include connectors 3300, for example DIN connectors, which may connect to the third valve 2500.

In example embodiments, the second control system 3000 may also include a receiver 3400 configured to receive a signal from a signal generator 3500 (for example, a transmitter). In example embodiments, the signal generator 3500 may be, but is not limited to, a two-button remote control transmitter which may send a signal to a receiver 3400 to control the third valve 2500. For example, in example embodiments, if a user wishes to cause the rod in the actuator 600 to extend, the user would push a button on the transmitter 3500 to send a signal to the receiver 3400. The receiver 3400 may then process the signal and control the junction box 3200 to cause the third valve 2500 to assume the second position, In the event the user wanted the rod of the actuator 600 to retract, the user would simply push another button on the transmitter 3500 to send a signal to the receiver 3400 which processes that signal and controls the junction box 3200 to cause the third valve 2500 to assume the third position to retract the piston. Thus, the second control system 3000 of example embodiments, in conjunction with the first control system 2000, allows the actuator 600 to be remotely operated.

Figure 16A:
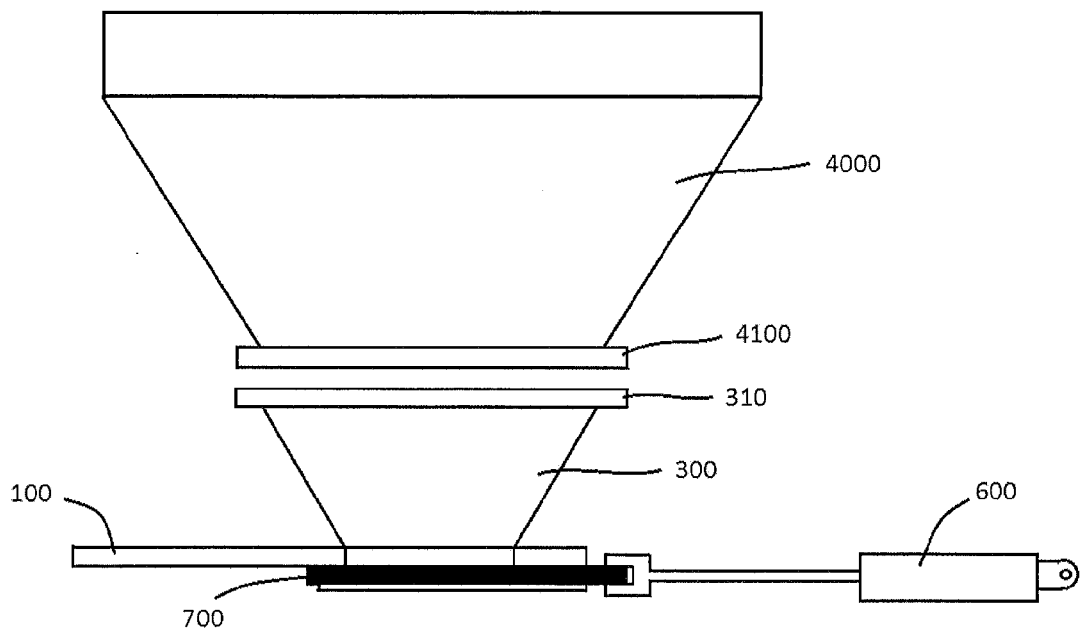
FIGS. 16A-16C illustrate the gate assembly attached to a bucket in accordance with example embodiments and a flow of a material flowing through the bucket in accordance with example embodiments.
Figure 16B:
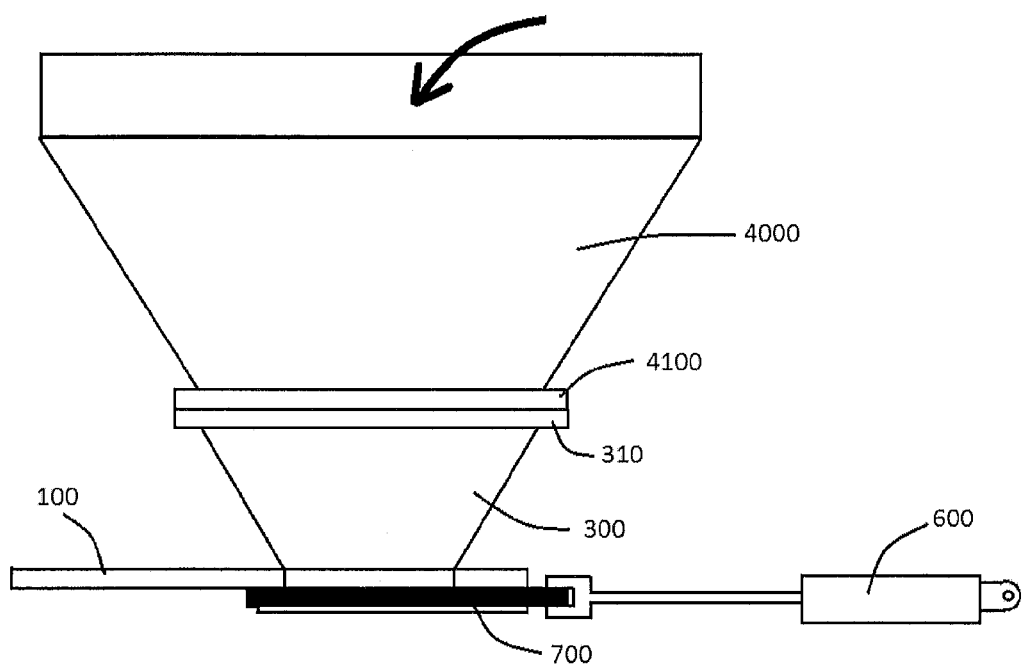
Figure 16C:
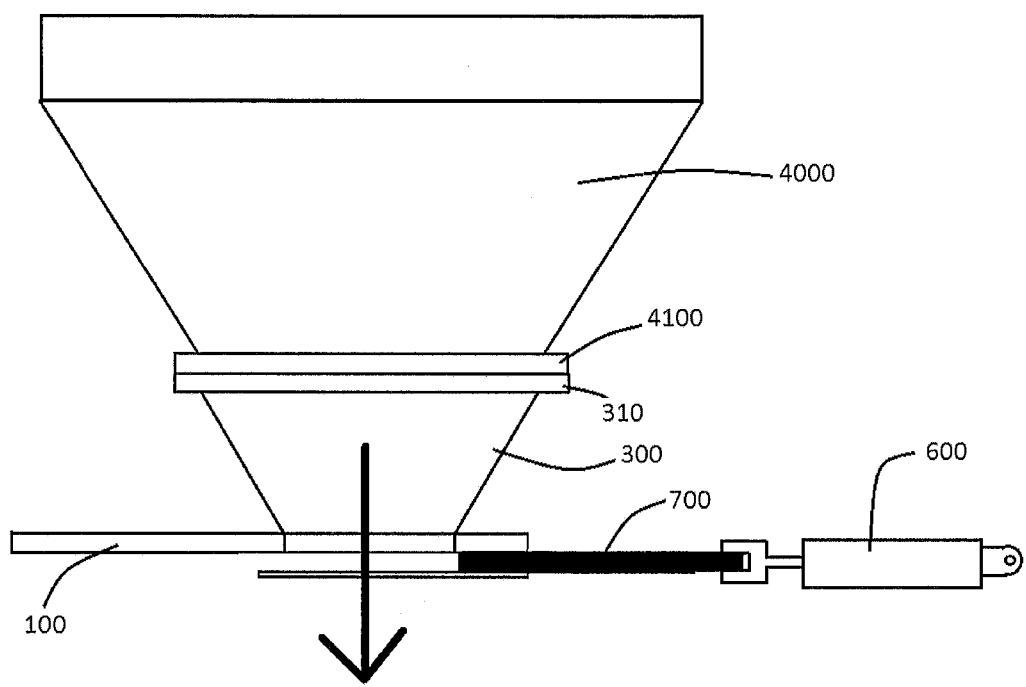

In example embodiments, the gate assembly 1000 may be used for multiple purposes. For example, as shown in FIG. 16A, the gate assembly 1000 may be attached to a barrel of a concrete bucket 4000. In FIG. 16A, only portions of the gate assembly 1000 are shown for the sake of clarity. Referring to FIG. 16A, a flange 4100 of the bucket 4000 may be connected to the flange 310 of the funnel 300 of the gate assembly 1000 by a conventional means, for example, bolting and/or welding. As shown in FIG. 16B, the gate 700 may be moved to a position that covers the aperture 190 of the base 100. In this configuration, concrete may be poured into and held in the bucket 4000 as shown by the arrow in FIG. 16B. After the bucket 4000 is properly filled, the bucket 4000 may be moved to a desired location. In the event a user wishes to unload the concrete, the user may activate the actuator 600 of the gate assembly either by remote control or manually to retract the rod of the actuator 600 to expose the aperture 190 of the base 100. Once exposed, concrete may flow through the aperture 190 as shown in FIG. 16C, The invention is clearly not restricted to the aforementioned example embodiments. For example, in example embodiments, the funnel 300 may be omitted from the gate assembly 1000 and the barrel of the concrete bucket 4000 may attach directly to the gate assembly by bolting and/or welding.

Figure 17A:
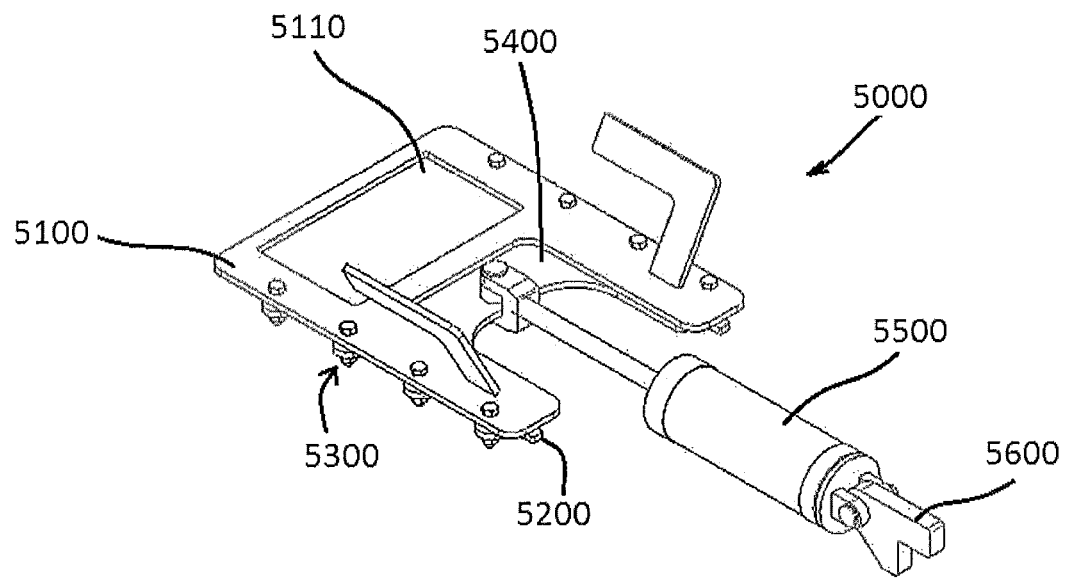
FIGS. 17A-17B are view of another gate assembly in accordance with example embodiments.
Figure 17B:
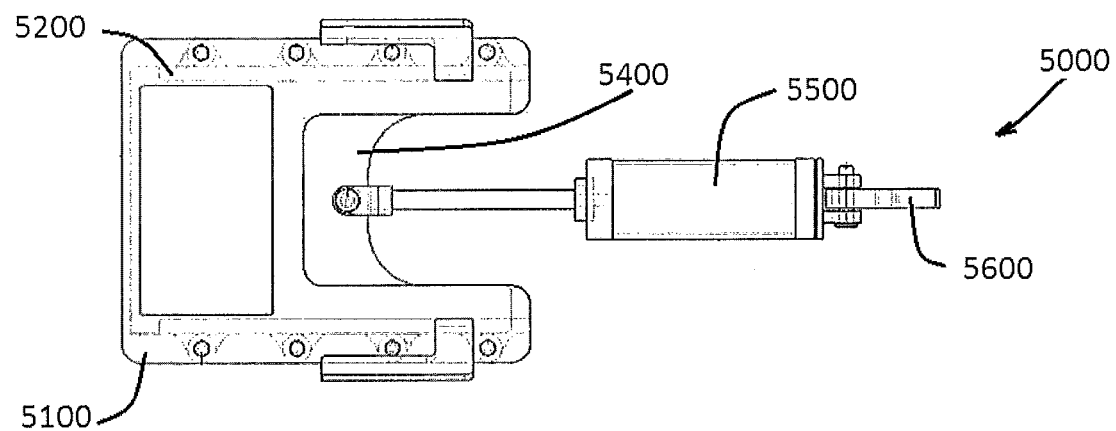

FIGS. 17A and 17B illustrate another example of a gate assembly 5000 in accordance with example embodiments. In example embodiments, the gate assembly 5000 may include a base 5100, a gate 5400 captured by a plurality of capture bars 5200, and an actuator 5500 attached to the gate 5400. In example embodiments, the actuator 5500 may be configured to move the gate 5400 along a length of the base 5100. In example embodiments, the base 5100 may include an aperture 5110 which may be completely covered by the gate 5400. Thus, the gate 5400 may control whether or not a material may pass through the base 5100 via the aperture 5110.

In example embodiments, the capture bars 5200 may be secured to base 5100 by fasteners 5300. In example embodiments, gate 5400, the capture bars 5200 and the fasteners 5300 may be substantially similar to the gate 700, the capture bars 800, and the fasteners 870, thus, detailed descriptions thereof are omitted for the sake of brevity. Furthermore, actuator 5500 may be controlled by a system that is substantially similar to the first control system 2000 and the second control system 3000. Thus, control systems for the gate assembly 5000 are omitted for the sake of brevity. However, it is understood that the gate 5400 may be controlled, either manually, or remotely, by a user consistent with the aforementioned description.

In example embodiments, the actuator 5500 may be secured to an external structure by a connecting device 5600. In example embodiments, the connecting device 5600 may be a bracket. On the other hand the connecting device may include an angled member, or a curved member that allows the actuator 5500 to attach to a tubular member.

Figure 18A:
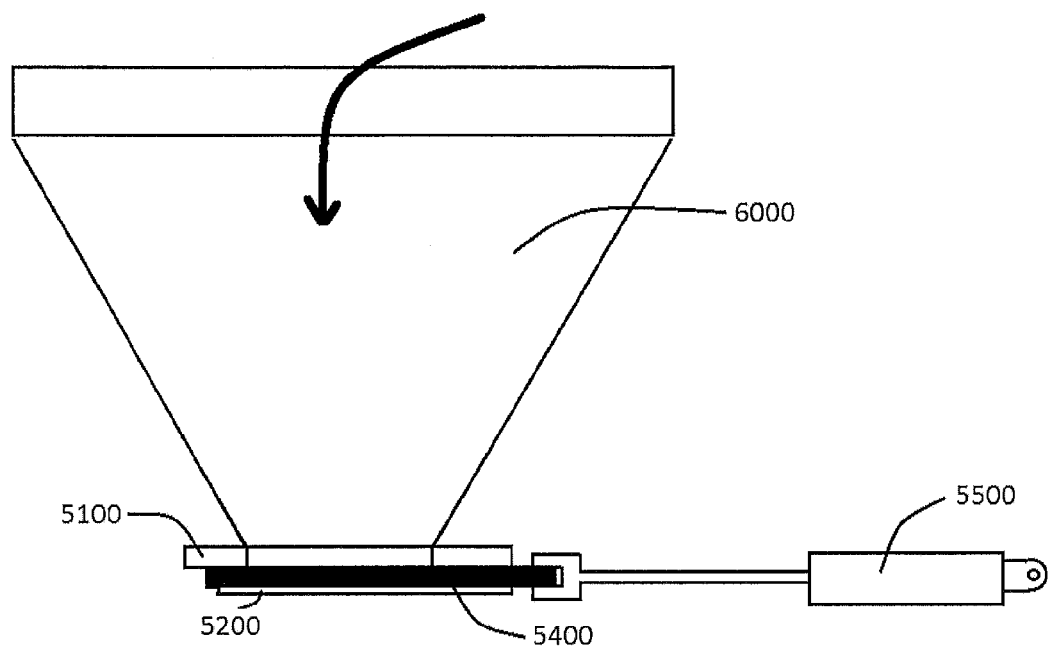
FIGS. 18A-18B illustrate the gate assembly attached to a bucket in accordance with example embodiments and a flow of a material flowing through the bucket in accordance with example embodiments.
Figure 18B:
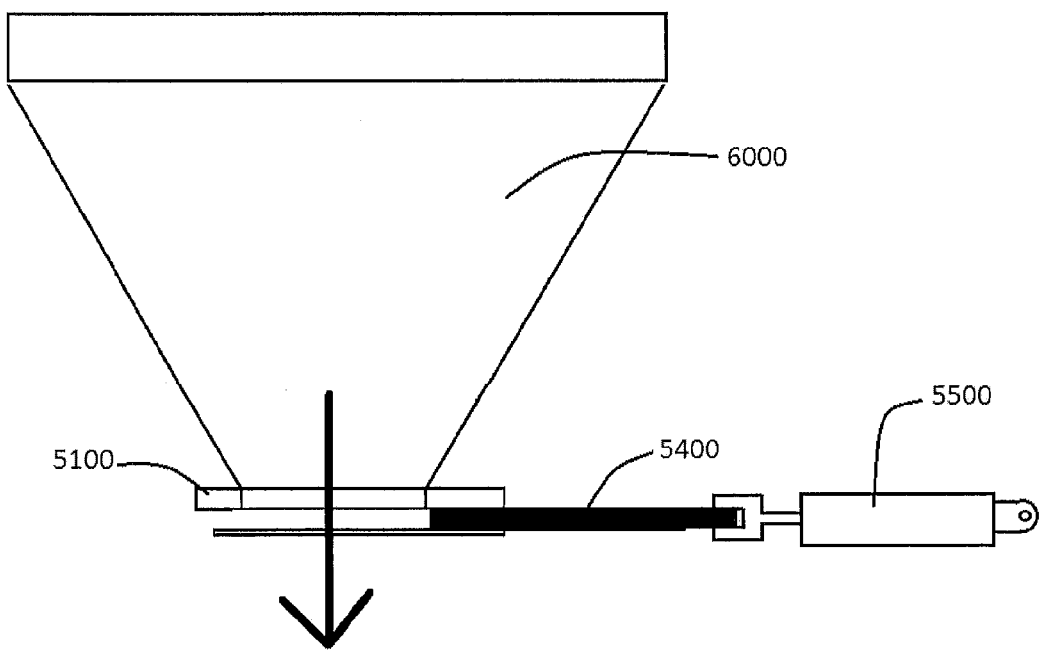

In example embodiments, the gate assembly 5000 may be used for multiple purposes. For example, as shown in FIGS. 18A and 18B, the gate assembly 5000 may be attached to a barrel of a concrete bucket 6000. In FIG. 18A, only portions of the gate assembly 5000 are shown for the sake of clarity. Referring to FIG. 18A, the gate 5400 may be moved to a position that covers the aperture 5110 of the base 5100. In this configuration, concrete may be poured into and held in the bucket 6000 as shown by the arrow in FIG. 18A. After the bucket 6000 is properly filled, the bucket 6000 may be moved to a desired location. In the event a user wishes to unload the concrete, the user may activate the actuator 5500 of the gate assembly 5000 either by remote control or manually to retract the rod of the actuator 5500 to expose the aperture 5110 of the base 5100. Once exposed, concrete may flow through the aperture 5110 as shown in FIG. 17B.

Thus far, example embodiments illustrate gate assemblies 1000 and 5000 that may be used to control a flow of material from bucket. For example, in FIGS. 17A-18B, the gate assemblies 1000 and 5000 may be arranged at the bottom of buckets 4000 and 6000 that may be filled with a material, for example, concrete. Since the gate assemblies 1000 and 5000 may be remotely operated, the buckets 4000 and 6000 may be moved from a first location to a second location and the contents thereof may be removed by remotely operating the gate assemblies 1000 and 5000. Furthermore, as the gate assemblies 1000 and 5000 may be arranged at a bottom of the buckets, gravity may cause the material to flow through the bases 100 and 5100 of the gate assemblies and directly towards the ground.

FIGS. 19A-19D are views of a bucket 7000 in accordance with example embodiments. As shown in FIGS. 19A-19D, the bucket 7000 may include a barrel 7200, a cone 7300 extending from a bottom of the barrel 7200, a circular base 7325 under the barrel 7200, and connecting members 7350 connecting the barrel 7200 to the circular base 7325. In example embodiments, the circular base 7325 may be attached to a pair of tubular members 7400 which may be configured to receive forks of a vehicle, for example, a forklift. Thus, in example embodiments, the bucket 7000 may be moved by a vehicle. In example embodiments the concrete bucket 7000 may further include a handle 7100 which may have an aperture 7110. In example embodiments, the aperture 7110 may be configured to receive a hook from a moving member, for example, a crane. Thus, in example embodiments the concrete bucket 7000 may be moved by a forklift or a crane.

Figure 19A:
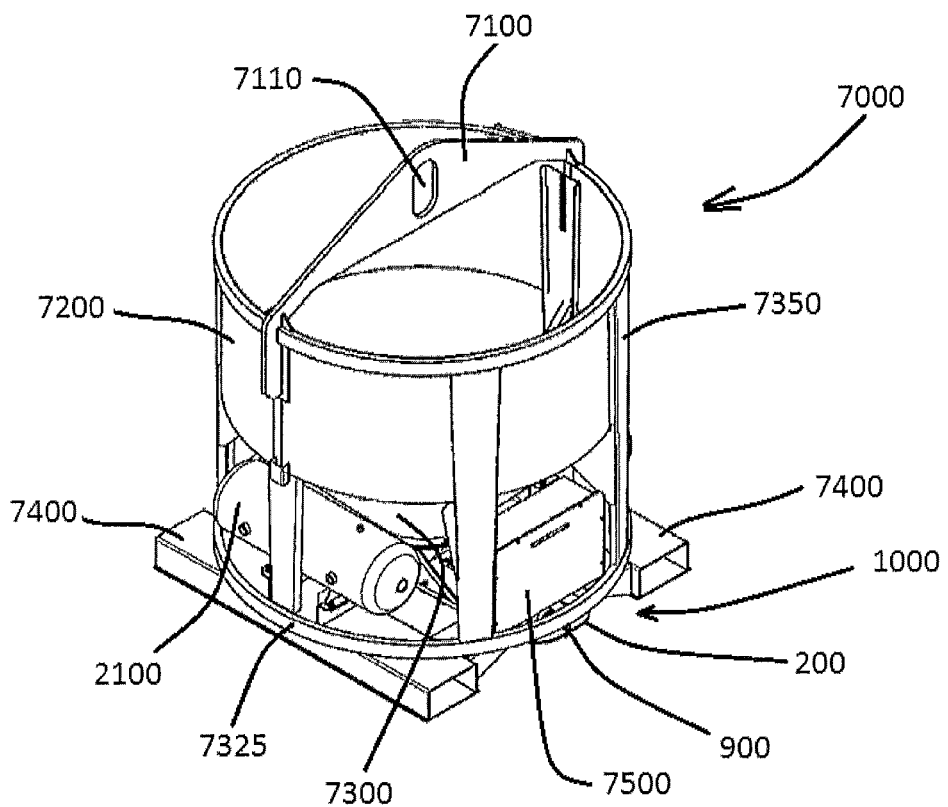
FIGS. 19A-19D illustrate an example of a bucket in accordance with example embodiments.
Figure 19B:
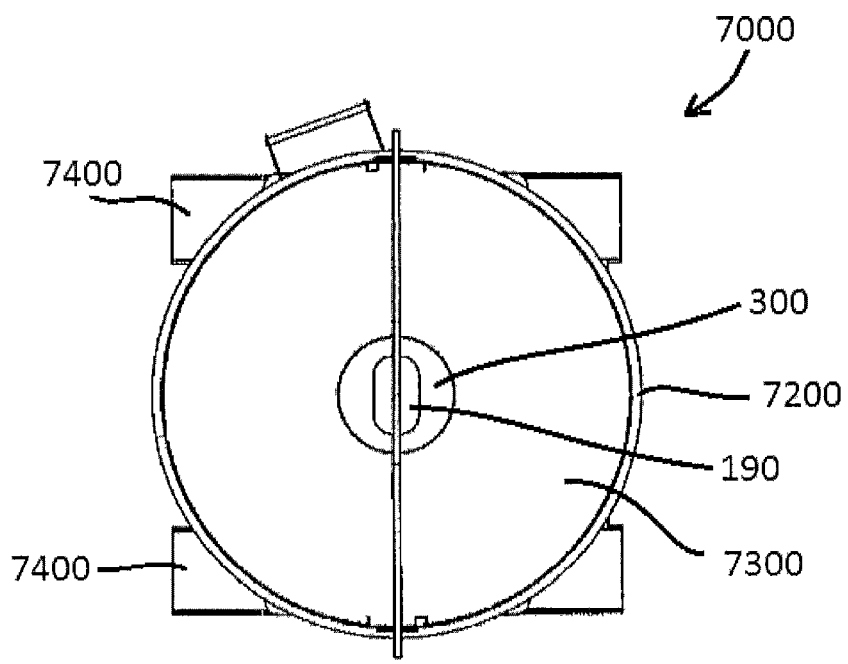

As shown in FIGS. 19A-19D, the gate assembly 1000 may be arranged under the cone 7300 and the funnel 300 of the gate assembly 1000 may be attached to the cone 7300 via a conventional method such as bolting or welding. In example embodiments, the supplemental base member 200 and the connecting member 900 are visible in at least FIG. 19A and the battery box 500 is visible in at least FIG. 19C. Referring to FIG. 19B (which is a top view of the bucket 7000), the aperture 190 of the base 100 is clearly visible. As explained above, the aperture 190 may be covered or exposed by the gate 700 of the gate assembly 1000.

Figure 19C:
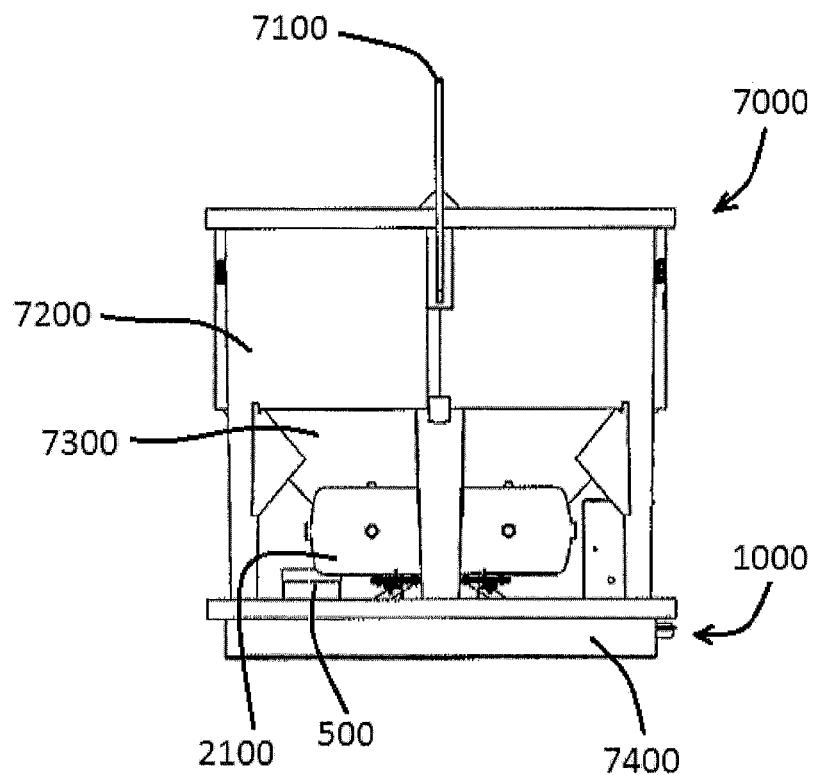
Figure 19D:
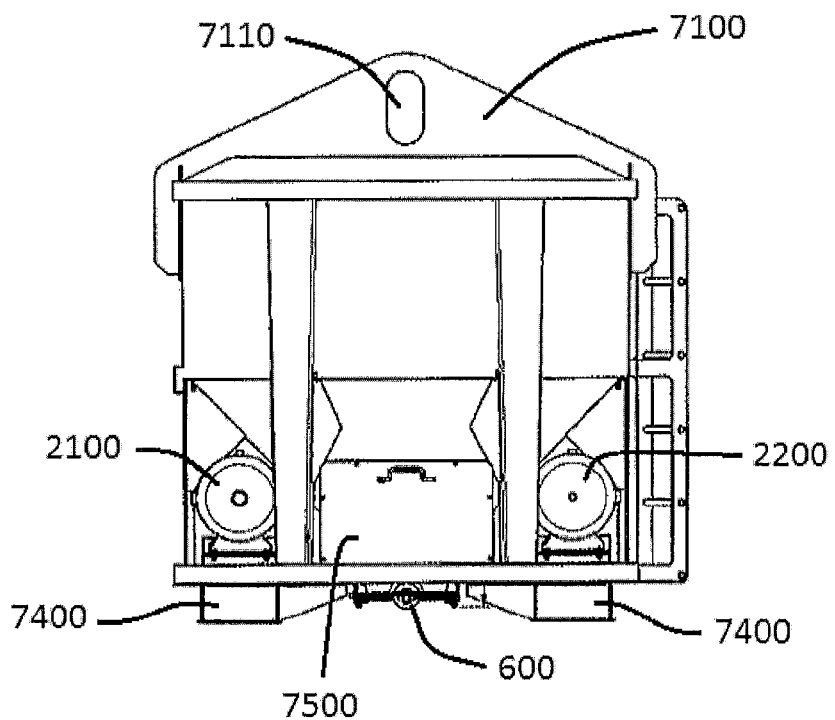

In example embodiments, the bucket 7000 may further include a pair of air tanks 2100 and 2200 as shown in FIGS. 19A, 19C, and 19D. In example embodiments the air tanks 2100 and 2200 may be used to actuate the actuator 600 of the gate assembly 1000 via a pneumatic system which may be substantially the same as the first control system 2000 illustrated in FIG. 13 as described above. For example, each of the valves and hoses illustrated in FIG. 13 may be on the bucket 7000. Furthermore, the bucket 7000 may include a control box which includes the receiver 3400, the junction box 3200, and the switch 3150 of the second control system 3000 as describe above and illustrated in FIG. 15. Thus, in example embodiments, the bucket 7000 includes not only an electrical power source 3100, which may be battery in the battery box 500, but the rest of the second control system 3000 (as illustrated in FIG. 15, except for the signal generator) and the control system 2000 which is illustrated in FIG. 13. Accordingly, the bucket 7000 may include all of the features necessary to enable a user to remotely control the gate 700 of the gate assembly 1000 thereby controlling when a material stored in the bucket may exit the bucket 7000.

Figure 20A:
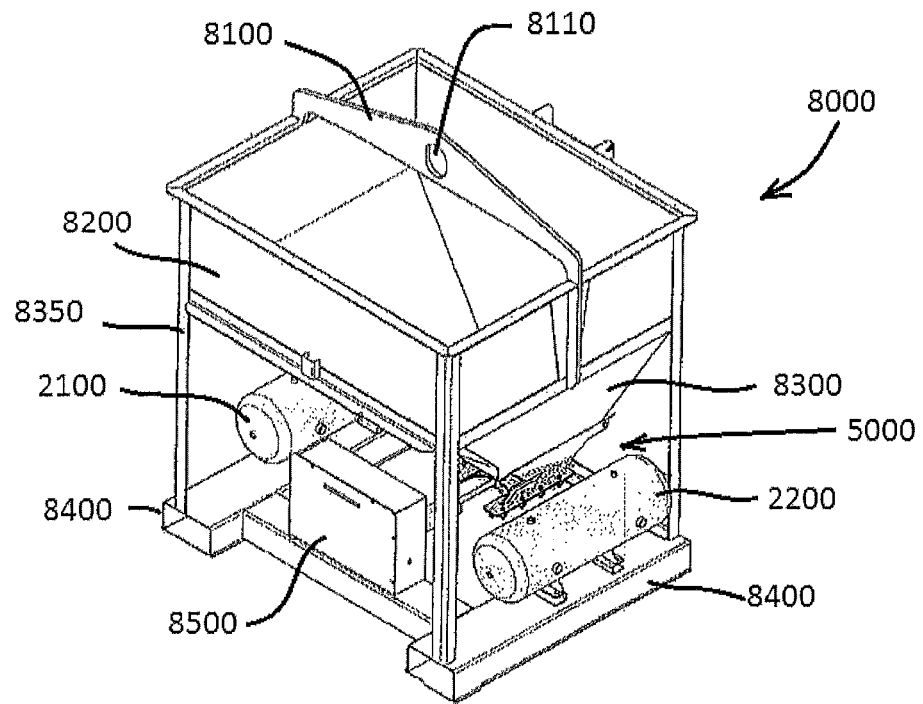
FIGS. 20A-20C illustrate an example of a bucket in accordance with example embodiments.
Figure 20B:
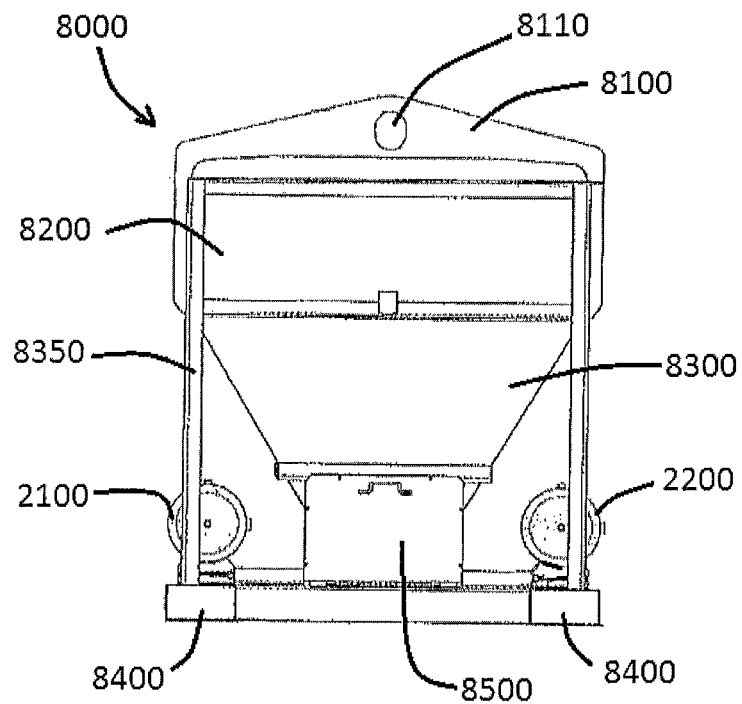
Figure 20C:
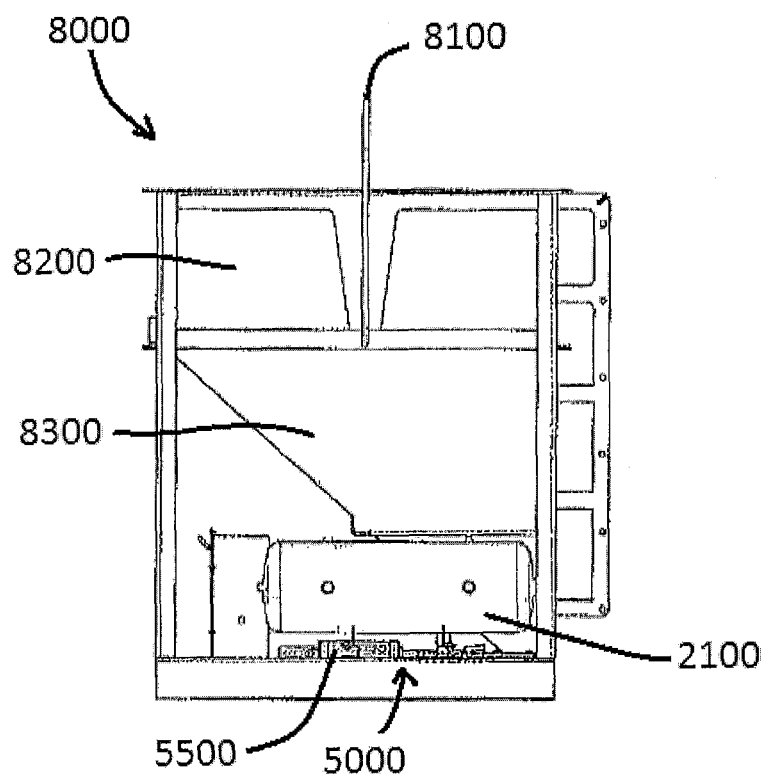

FIGS. 20A-20C are views of a bucket 8000 in accordance with example embodiments. As shown in FIGS. 20A-20C, the bucket 8000 may include a barrel 8200, a cone 8300 extending from a bottom of the barrel 8200, a rectangular base under the barrel 8200, and connecting members 8350 connecting the barrel 8200 to the rectangular base. In example embodiments, the rectangular base may include a pair of tubular members 8400 which may be configured to receive forks of a vehicle, for example, a forklift. Thus, in example embodiments, the bucket 8000 may be moved by a vehicle. In example embodiments the bucket 8000 may further include a handle 8100 which may have an aperture 8110. In example embodiments, the aperture 8110 may be configured to receive a hook from a moving member, for example, a crane. Thus, in example embodiments the bucket 8000 may be moved by a forklift or a crane.

As shown in FIGS. 20A-20C, the gate assembly 5000 may be arranged under the cone 8300 such that the cone 8300 may terminate on the base 5100 and over the aperture 5110. In example embodiments, a battery (not shown) may be provided on the bucket 8000.

In example embodiments, the bucket 8000 may further include a pair of air tanks 2100 and 2200 as shown in at least FIG. 20B. In example embodiments the air tanks 2100 and 2200 may be used to actuate the actuator 5500 of the gate assembly 5000 via a pneumatic system 2000 which may be substantially the same as the first control system 2000 illustrated in FIG. 13 as described above. For example, each of the valves and hoses illustrated in FIG. 13 may be on the bucket 8000. Furthermore, the bucket 8000 may include a control box 8500 which includes the receiver 3400, the junction box 3200, and the switch 3150 of the electrical system 3000 as describe above and illustrated in FIG. 15. Thus, in example embodiments, the bucket 8000 includes not only an electrical power source, which may be attached to the bucket 8000, but the rest of the second control system 3000 (as illustrated in FIG. 15, except for the signal generator) and the control system 2000 which is illustrated in FIG. 13. Accordingly, the bucket 8000 may include all of the features necessary to enable a user to remotely control the gate 5400 of the gate assembly 5000 thereby controlling when a material stored in the bucket 8000 may exit the bucket 8000.

The above examples are illustrative only and are not intended to limit the invention. For example, in example embodiments, two air sources 2100 and 2200 are illustrated as being associated with the first control system 2000. However, in example embodiments, the first control system 2000 may include only one air source (that is, one of 2100 and 2200) or more than two air sources. Furthermore, in example embodiments, while two control systems 2000 and 3000 are described above, each control system may be considered part of a larger control system which controls the gate assemblies 1000 and 5000. In addition, the illustrated gate assemblies 1000 and 5000, which are usable for controlling a flow of material flowing out of a barrel, are not intended to limit the invention, since there are many ways one skilled in the art may design a gate assembly to control a flow of material associated with a bucket.

Example embodiments describe examples of buckets which may be used to hold and deposit a material. For example, FIGS. 19A-19D illustrate a bucket 7000 comprising a gate assembly 1000 attached to a barrel 7200, the gate assembly 1000 including an actuator and 600 a gate 700 configured to control a flow of the material out of the barrel 7200. In example embodiments, the bucket 7000 further includes a first a control system 2000 configured to control the actuator 600 and a second control system 3000 configured to control the first control system 2000. In example embodiments, the second control system 3000 may include a receiver 3400 configured to receive a signal from a signal generator 3500 to control the first control system 2000. Similarly, FIGS. 20A-20C illustrate a bucket 8000 comprising a gate assembly 5000 attached to a barrel 8200, the gate assembly 5000 including an actuator 5500 and a gate 5400 configured to control a flow of the material out of the barrel 8200. In example embodiments, the bucket 8000 further includes a first a control system 2000 configured to control the actuator 5500 and a second control system 3000 configured to control the first control system 2000. In example embodiments, the second control system 3000 may include a receiver 3400 configured to receive a signal from a signal generator 3500 to control the first control system 2000.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What we claim is:

1. A mobile bucket comprising:
   a barrel;
   a gate assembly including a pneumatic actuator and a gate configured to control a flow of the material out of the barrel;
   at least one refillable air tank configured to provide air to the pneumatic actuator:
   a first control system including a first valve providing fluid communication between the at least one refillable air tank and the pneumatic actuator, the first control system configured to control the pneumatic actuator;

a second control system configured to control the first control system, the second control system including a receiver configured to receive a signal from a signal generator to control the first valve of the first control system; and a frame supporting the barrel, the gate assembly, the at least one refillable air tank, the first control system, and a receiver of the second control system so that when the frame is moved the barrel, the gate assembly, the at least one refillable air tank, the first control system, and the receiver of the second control system move together as a single unit.

2. The mobile bucket according to claim 1, wherein the first valve is a solenoid valve.

3. The mobile bucket according to claim 1, wherein the first control system is configured for manual operation and remote operation.

4. The mobile bucket according to claim 1, wherein the first control system includes a second valve configured to receive a first fluid and send the first fluid to one of the first valve and a third valve.

5. The mobile bucket according to claim 1, wherein the second control system includes an electrical system including a junction box for controlling the first control system.

6. The mobile bucket according to claim 5, wherein the the first valve is controlled by the electrical system.

7. The mobile bucket according to claim 5, wherein the first valve is configured to receive air from the at least one refillable air tank.

8. The mobile bucket according to claim 1, wherein the gate assembly is arranged at a bottom of the barrel.

9. The mobile bucket according to claim 8, wherein the gate assembly includes a base with an aperture.

10. The mobile bucket according to claim 9, wherein gate assembly includes captures bars capturing the gate and the capture bars are configured to allow the gate to slide along a length of the base to one of expose and cover the aperture.

11. The mobile bucket according to claim 10, further comprising:

a battery to power the second control system.

12. A bucket comprising:

a barrel configured to hold a material;

a gate assembly arranged at a bottom of the barrel, the gate assembly including a base having a plurality of capture bars capturing a gate configured to slide along a length of the base, the gate assembly further including a pneumatic actuator configured to move the gate to one of expose and cover an aperture in the base;

at least one refillable air tank configured to provide air to the pneumatic actuator;

a first control system comprising an electrically controlled valve configured to I control the pneumatic actuator; and a second control system configured to control the electrically controlled valve, the second control system including a receiver configured to receive a signal from a signal generator to control the electrically controlled valve; and a frame supporting the barrel, the gate assembly, the at least one refillable air tank, the first control system, and a receiver of the second control system so that when the frame is moved the barrel, the gate assembly, the at least one refillable air tank, the first control system, and the receiver of the second control system move together as a single unit.

13. The bucket according to claim 12, further comprising: a battery, wherein the first control system is configured to transfer air from the at least one refillable air tank to the electrically controlled valve; and the second control system is configured to allow electricity to flow from the battery to the electrically controlled valve.

14. The bucket according to claim 13, wherein the gate assembly is configured to allow the material to flow vertically out of the barrel.

15. The bucket according to claim 13, wherein the gate assembly includes a battery box enclosing the battery.

16. The bucket according to claim 13, wherein the first control system further includes a second valve configured to one of flow air to the electrically controlled valve and a third valve.

* * * * *